United States Patent
Sakagawa et al.

(10) Patent No.: US 6,930,685 B1
(45) Date of Patent: Aug. 16, 2005

(54) IMAGE PROCESSING METHOD AND APPARATUS

(75) Inventors: Yukio Sakagawa, Tokyo (JP); Akihiro Katayama, Yokosuka (JP); Daisuke Kotake, Yokohama (JP); Masakazu Fujiki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,836

(22) Filed: Feb. 25, 2000

(30) Foreign Application Priority Data

| Aug. 6, 1999 | (JP) | 11-223958 |
| Aug. 6, 1999 | (JP) | 11-223959 |
| Aug. 31, 1999 | (JP) | 11-246770 |

(51) Int. Cl.[7] ............................................ H04N 5/262
(52) U.S. Cl. .................. 345/426; 345/629; 348/584
(58) Field of Search .............................. 345/419, 719, 345/426, 764, 632–634, 803, 781, 629; 348/584–587

(56) References Cited

U.S. PATENT DOCUMENTS

| 5,729,672 A | * | 3/1998 | Ashton ........................ 345/589 |
| 5,737,031 A | * | 4/1998 | Tzidon et al. ............... 348/587 |
| 5,831,619 A | * | 11/1998 | Nakagawa et al. ......... 345/419 |
| 6,400,362 B1 | * | 6/2002 | Uchiyama et al. .......... 345/420 |

FOREIGN PATENT DOCUMENTS

| EP | 0 865 001 A2 | 9/1998 |
| JP | 64-004871 | 1/1989 |
| JP | 01-281574 | 11/1989 |
| JP | 06-105826 | 4/1994 |
| JP | 06-274579 | 9/1994 |
| JP | 06-307833 | 11/1994 |
| JP | 07-027531 | 1/1995 |
| JP | 07-260443 | 10/1995 |
| JP | 08-210820 | 8/1996 |
| JP | 10-255081 | 9/1998 |
| JP | 11-134519 | 5/1999 |

OTHER PUBLICATIONS

Zhang, "Modeling Geometric Structure and Illumination Variation of a Scene from Real Images", Sixth International Conference on Computer Vision, Jan. 1998.*

(Continued)

*Primary Examiner*—David E. Harvey
(74) *Attorney, Agent, or Firm*—Fitzpatrick, Cella, Harper & Scinto

(57) ABSTRACT

There is provided an image processing apparatus for describing a real image as a virtual object using space data formed based on a photo image of the real object, and generating a virtual image of the virtual object using the space data. The image processing apparatus captures the photo image of the real object from a real camera viewpoint position while illuminating the real object by an illumination light source placed at a real illumination position. The captured photo image is converted into space data in the form of an object for each pixel, and the space data is stored in a memory together with various illumination conditions at the real illumination position to allow a search at a later time.

28 Claims, 36 Drawing Sheets

OTHER PUBLICATIONS

"Mixed Reality", Hideyuki Tamura, et al., Institute of Image Information and Television and Television Engineers, Mar. 20, 1998, vol. 52, pp. 266-272.

"Illuminating Image-Based Objects," Wong, et al., Proceedings of the Fifth Pacific Conference on Computer Graphics and Applications, Seoul, South Korea, IEEE Computer Society, 1997, pp. 69-78, 219.

"A Cyber-Space Creation By Mixing Ray Space Data With Geometric Models," Akihiro Katayama, et al., Systems and Computers in Japan, Scripta Technical Journals, vol. 29, No. 9, Nov. 1997, p. 21-31.

Akihiro Katayama, et al., "A Cyber-Space Creation by Mixing Ray Space Data with Geometric Models", IEICE Journal D-11, vol. J80-D-II No. 11, pp. 3048-3057.

Toshiaki Fujii, et al., "Transformation of Hologram and Ray Space for Integrated 3D Visual Communication", 3D Image Conference '95, Jul. 6 and 7, 1995, pp. 220-225.

* cited by examiner

FIG. 16

| ILLUMINATION ID | ON / OFF | POSITION | INTENSITY | COLOR |
|---|---|---|---|---|
| L1 | | | | |
| L2 | | | | |
| L3 | | | | |
| ... | | | | |
| ... | | | | |

F I G. 36

| ILLUMINATION POSITION (n) | RAY SPACE DATA RS ($L_n$) |
|---|---|
| $L_1$ | RS ($L_1$) |
| $L_2$ | RS ($L_2$) |
| ⋮ | ⋮ |
| $L_k$ | RS ($L_k$) |

F I G. 37

| ILLUMINATION POSITION (n) | SHADOW DATA SHADOW ($L_n$) |
|---|---|
| $L_1$ | SHADOW ($L_1$) |
| $L_2$ | SHADOW ($L_2$) |
| ⋮ | ⋮ |
| $L_k$ | SHADOW ($L_k$) |

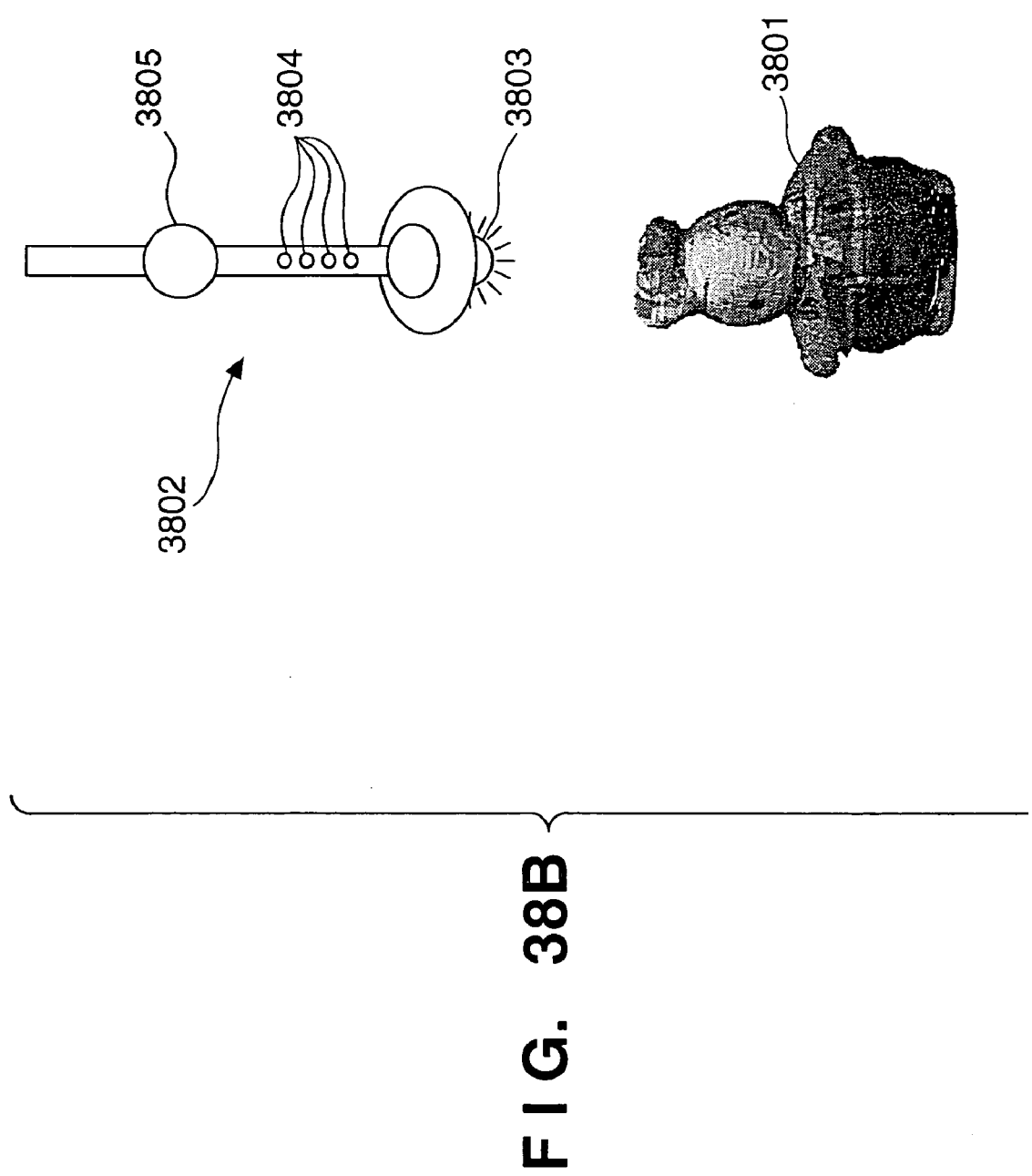
F I G. 38B

IMAGE PROCESSING METHOD AND APPARATUS

FIELD OF THE INVENTION

The present invention relates to an image processing apparatus and method for shading or shadowing a virtual object using a virtual light source upon expressing a virtual space on the basis of photo image data.

The present invention also relates to an image processing apparatus and method for changing a real illumination condition in real time and generating a mixed reality image in accordance with the changed condition.

BACKGROUND OF THE INVENTION

Many schemes for describing a virtual space based not on a three-dimensional geometric shape but on a photo image have been proposed. Such schemes are called Image Based Rendering (to be abbreviated as IBR hereinafter), and can express a virtual space with high reality that cannot be obtained by a scheme based on a three-dimensional geometric shape.

Attempts to describe a virtual space on the basis of the ray space theory as one IBR scheme have been proposed. See, for example, "Implementation of Virtual Environment by Mixing CG model and Ray Space Data", IEICE Journal D-11, Vol. J80-D-11 No. 11, pp. 3048–3057, November 1997, or "Mutual Conversion between Hologram and Ray Space Aiming at 3D Integrated Image Communication", 3D Image Conference, and the like.

The ray space theory will be explained below.

As shown in FIG. 1, a coordinate system 0-X-Y-Z is defined in a real space. A light ray that passes through a reference plane P (Z=z) perpendicular to the Z-axis is defined by a position (x, y) where the light ray crosses P, and variables $\theta$ and $\phi$ that indicate the direction of the light ray. More specifically, a single light ray is uniquely defined by five variables (x, y, z, $\theta$, $\phi$). If a function that represents the light intensity of this light ray is defined as f, light ray group data in this space can be expressed by f(x, y, z, $\theta$, $\phi$). This five-dimensional space is called a "ray space".

If the reference plane P is set at z=0, and disparity information of a light ray in the vertical direction, i.e., the degree of freedom in the $\phi$ direction is omitted, the degree of freedom of the light ray can be reduced to two dimensions. This x-$\theta$ two-dimensional space is a partial space of the ray space. As shown in FIG. 3, if u=tan $\theta$, a light ray (FIG. 2) which passes through a point (X, Z) in the real space is mapped onto a line in the x-u space, which line is given by:

$$X = x + uZ \quad (1)$$

Image sensing by a camera corresponds to registering in an imaging plane the rays that passes through the lens focal point of the camera, and the intensity and color of the ray is represented as an image. In other words, the set of light rays that passes through one point in the real space, i.e., the focal point position, corresponds to the set of captured pixels. In this, since the degree of freedom in the $\phi$ direction is omitted, and the behavior of a light ray is examined in only the X-Z plane, only pixels on a line segment that intersects a plane perpendicular to the Y-axis need be considered. In this manner, by sensing an image, light rays that pass through one point can be collected, and data on a single line segment in the x-u space can be captured by single image sensing.

When an image is sensed a large number of times by changing the viewpoint position, light ray groups which pass through a large number of points can be captured. When the real space is sensed using N cameras, as shown in FIG. 4, data on a line given by:

$$x + Z_n u = X_n \quad (2)$$

can be input in correspondence with a focal point position $(X_n, Z_n)$ of the n-th camera (n=1, 2, . . . , N), as shown in FIG. 5. In this way, when an image is sensed from a sufficiently large number of view points, the x-u space can be densely filled with data.

Conversely, an image observed from a new arbitrary viewpoint position can be generated (FIG. 7) from the data of the x-u space (FIG. 6). As shown in FIG. 7, an image observed from a new viewpoint position E(X, Z) indicated by an eye mark can be generated by reading out data on a line given by equation (1) from the x-u space.

In the mixed reality space that takes a photo image into a virtual space, real and virtual spaces are mixed. For this reason, image processes which are easy to implement in a real or virtual space alone may become hard to implement.

Image processes using photo image data do not excel in addition of shades and generation of a shadow by means of virtual illumination. This is because although shades or shadow change in accordance with the three-dimensional pattern of an object, it is hard to reconstruct shades or shadow since photo image data does not have any information pertaining to the geometric shape of the object. That is, a technique for rendering a virtual object on the basis of space data including geometric shape information, rendering shades to be added to that object or rendering a shadow formed by the object is known to those skilled in an image processing field based on geometric shape information (e.g., computer graphics (to be abbreviated as CG hereinafter)), but is unknown in an image processing field using a photo image such as a ray space or the like.

One difficulty in generation of a mixed reality space involves changing a real illumination condition and mixing a virtual image with a real space in real time in correspondence with the change in illumination condition.

Conventionally, the brightness of a real space is measured by a batch method, and the detected illumination condition is reflected in the mixed reality space.

SUMMARY OF THE INVENTION

The present invention has been proposed to solve the conventional problems, and has as its object to provide an image processing method and apparatus suitable for recording space data, which is suitable for generating shades of a virtual object from space data based on a photo image.

It is another object of the present invention to provide an image processing method and apparatus for generating shades of a virtual object from space data based on a photo image at high speed.

It is still another object of the present invention to provide an image processing method and apparatus capable of appropriately generating shades even when the position or condition of a virtual light source is arbitrarily changed.

It is still another object of the present invention to provide an image processing method and apparatus capable of generating shades for a virtual object described in space data based on a photo image.

It is still another object of the present invention to provide an image processing method and apparatus capable of pasting a shadow image to a virtual object image from space data based on a photo image.

It is still another object of the present invention to provide an image processing method and apparatus suitable for real-time processes for directly generating a shadow image from space data, and pasting the shadow image in a virtual space.

It is still another object of the present invention to provide a mixed reality presentation apparatus for constructing a mixed reality space in response to a change in real illumination condition in real time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 is a table which stores illumination conditions set upon obtaining ray space data shown in FIG. 15;

FIG. 36 shows a table stored in a memory, in which illumination positions (Ln) and ray space data RS(Ln) are registered.

FIG. 37 shows a table stored in a memory, in which illumination positions (Ln) and shadow data SHADOW(Ln) are registered.

FIGS. 38A to 38C show change of a displayed object in accordance with operation of virtual illumination.

DETAILED DESCRIPTION OF THE PREFERRED EMBODIMENTS

Preferred embodiments of the present invention will now be described in detail in accordance with the accompanying drawings.

First Embodiment

An image processing apparatus and method according to the first embodiment of the present invention will be described in detail below with reference to the accompanying drawings. The image processing apparatus and method have a function of rendering shades to be added to a virtual object by a virtual illumination from ray space data, and rendering a shadow by the virtual illumination.

Figure 8:
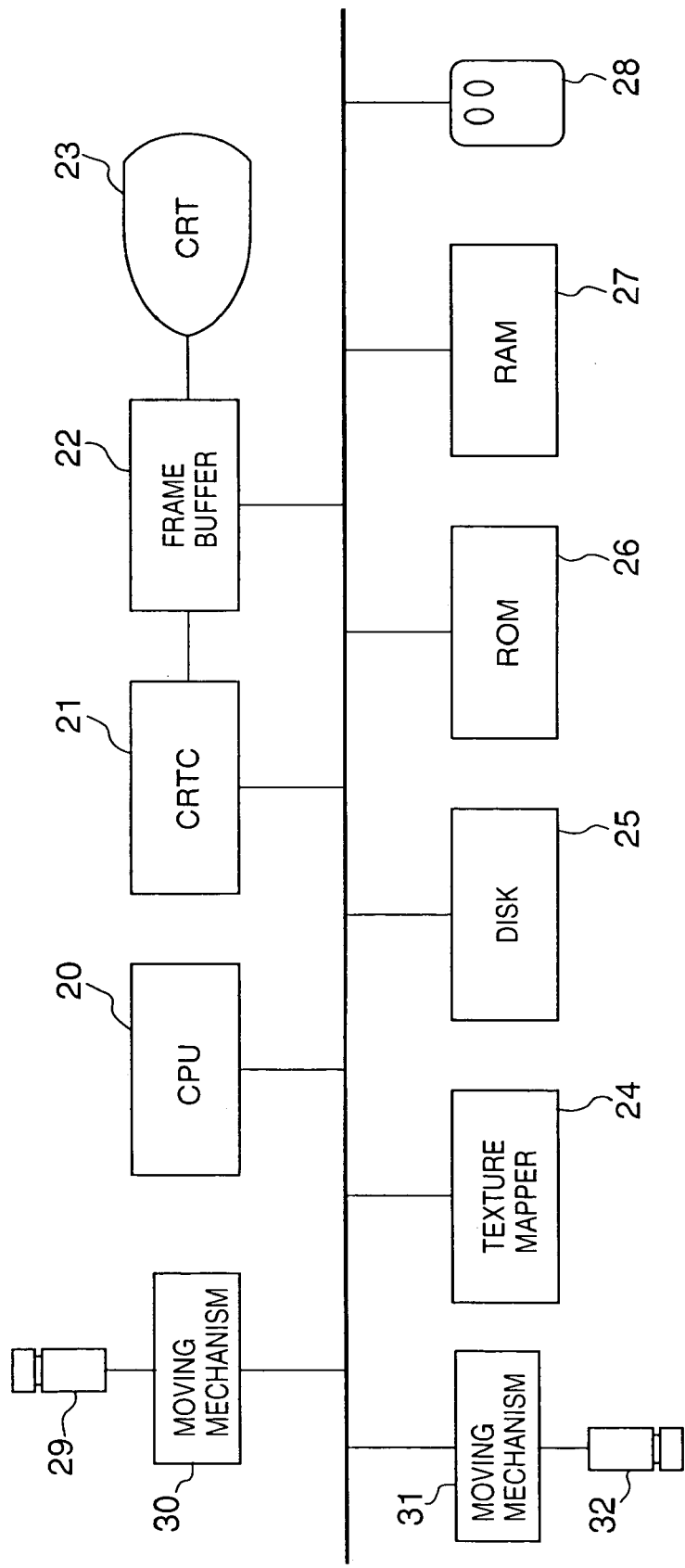
FIG. 8 is a block diagram for explaining the arrangement of image processing apparatus according to the first embodiment of the present invention.

FIG. 8 shows the arrangement of an image processing system of this embodiment. The hardware arrangement shown in FIG. 8 is that of a normal workstation. More specifically, the hardware arrangement itself is the same as that of a normal workstation.

Figure 1:
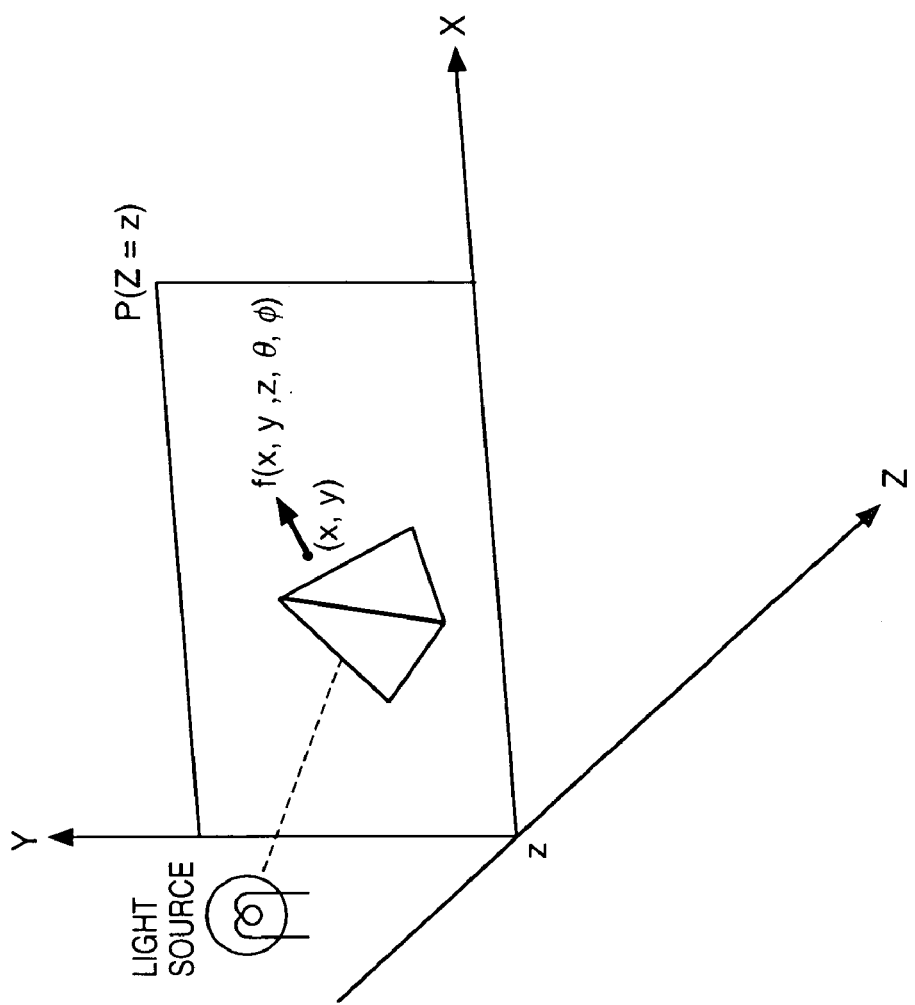
FIG. 1 is a view for explaining the principle for generating ray space data.
Figure 2:
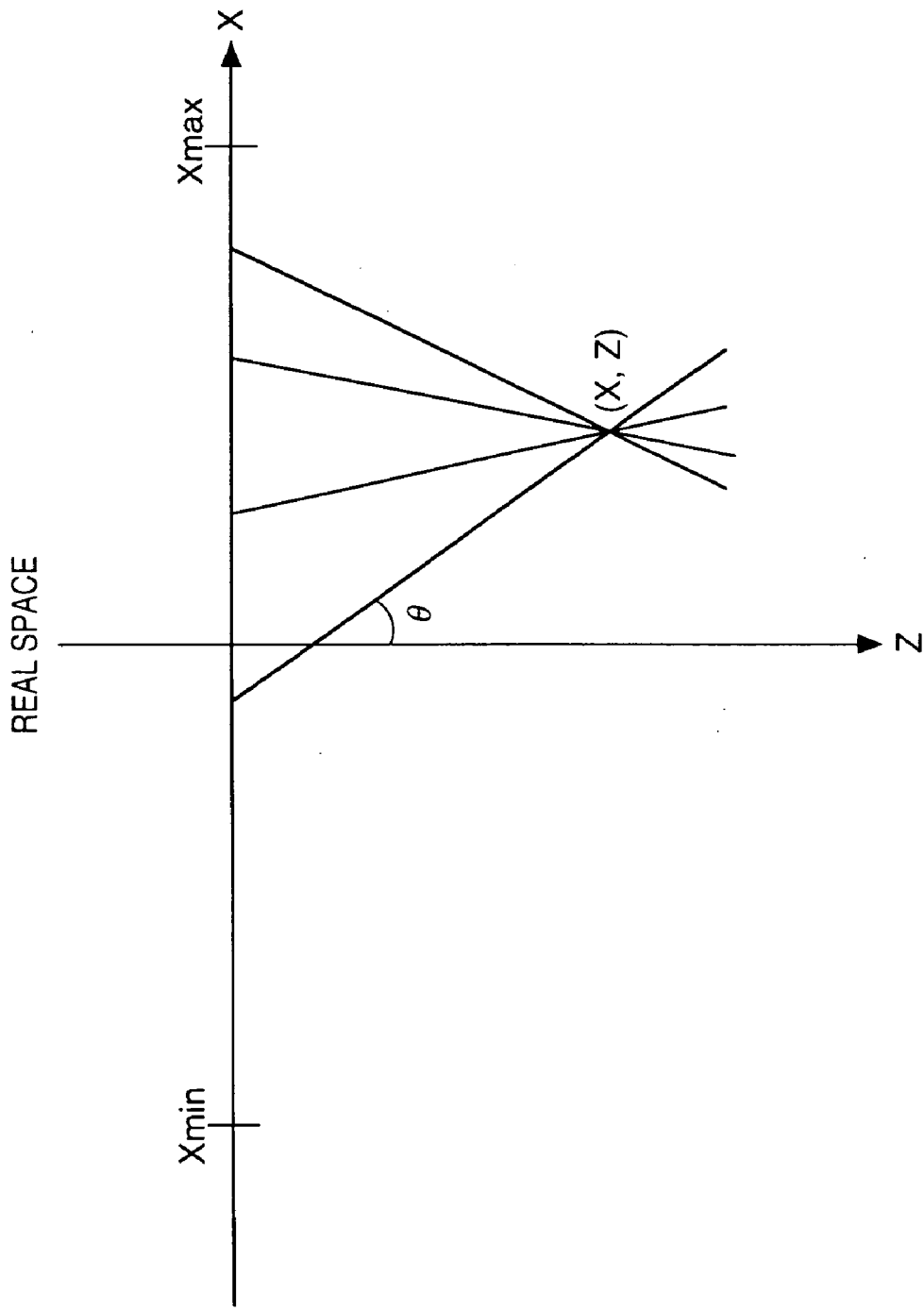
FIG. 2 is a view for explaining data in a real space.
Figure 3:
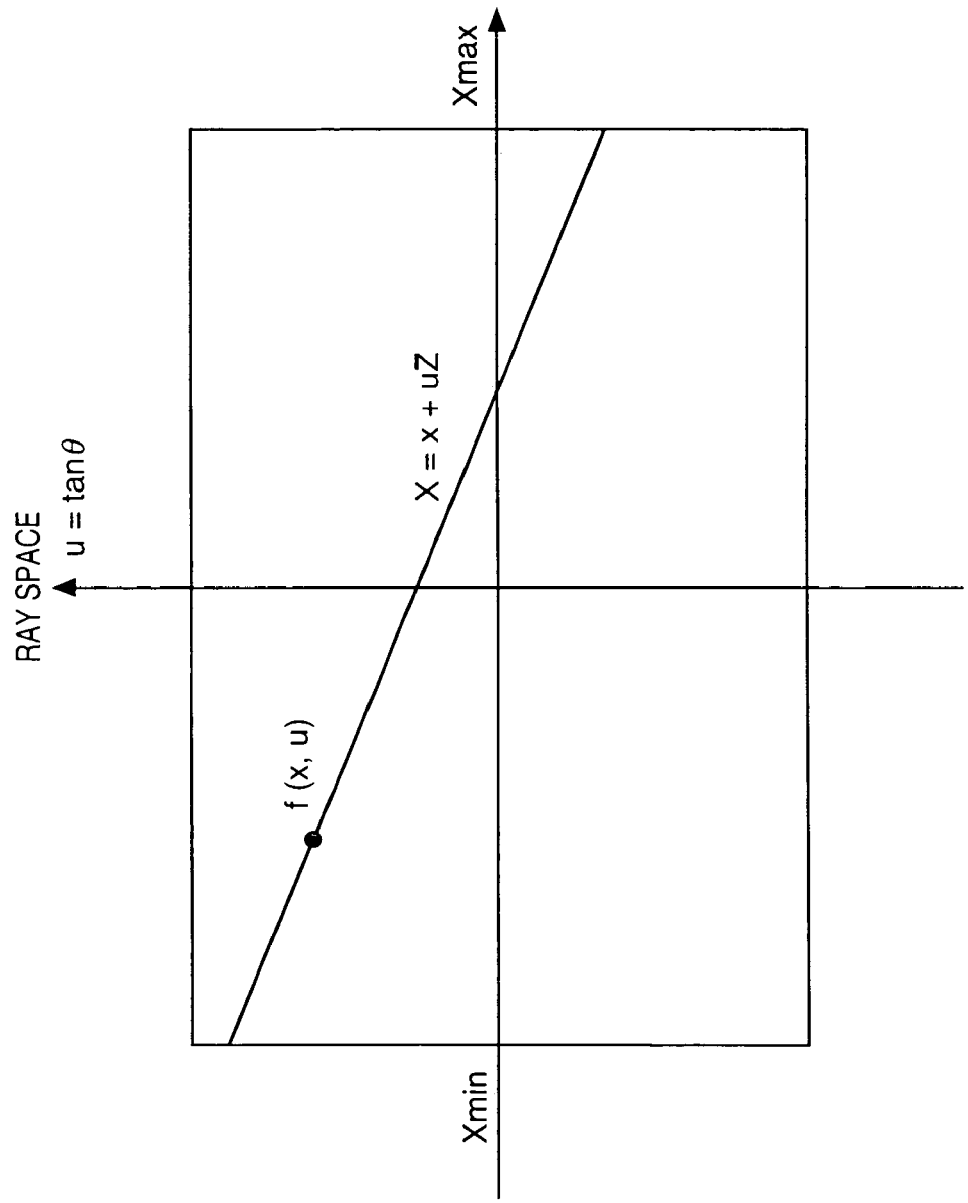
FIG. 3 is a view showing the space shown in FIG. 2, which is expressed by ray space data.
Figure 4:
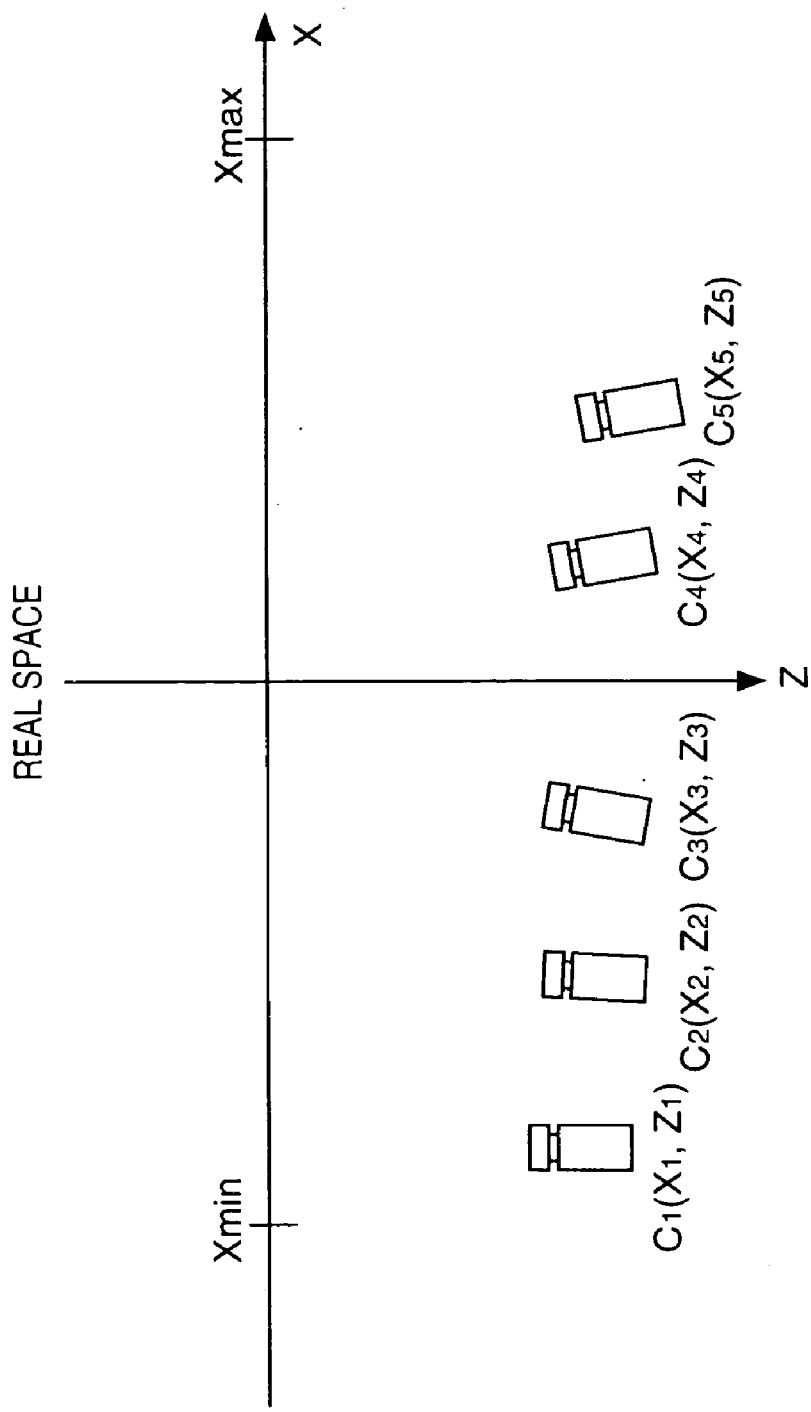
FIG. 4 is a view for explaining the principle of generating real space data when there are a plurality of cameras.
Figure 5:
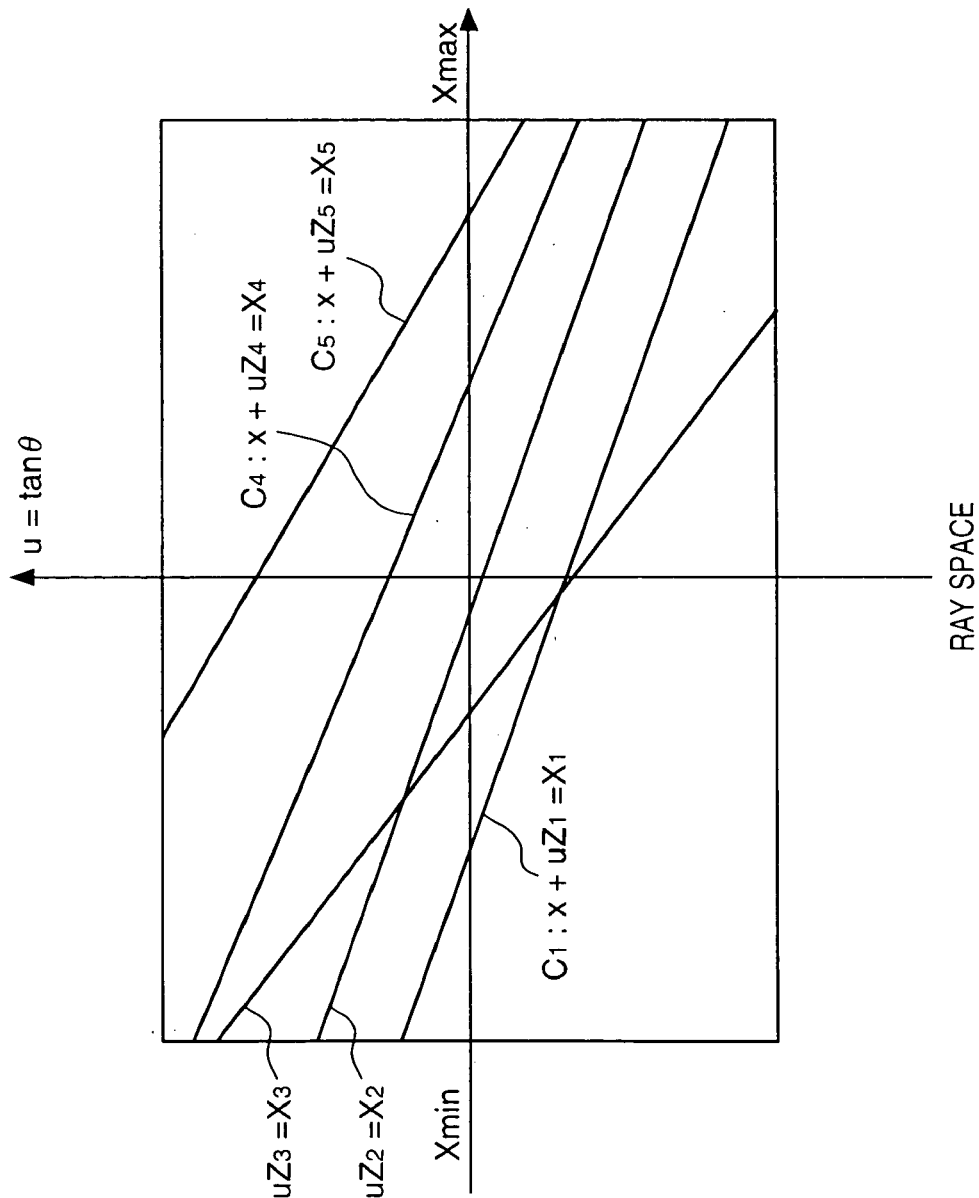
FIG. 5 is a view for explaining the principle of generating ray space data when there are a plurality of cameras.
Figure 6:
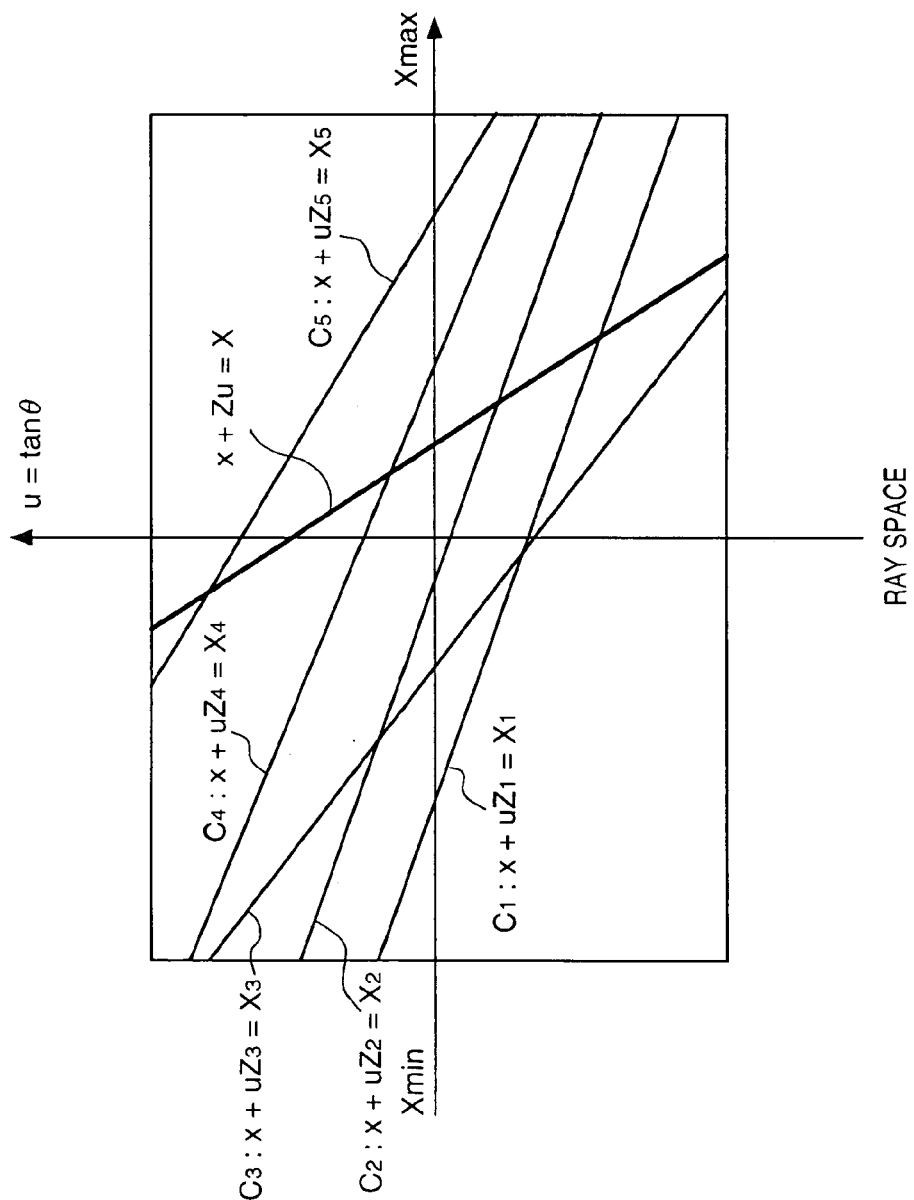
FIG. 6 is a view for explaining the principle of generating ray space data (x+Zu=X) at an arbitrary viewpoint position from ray space data when there are a plurality of cameras.
Figure 7:
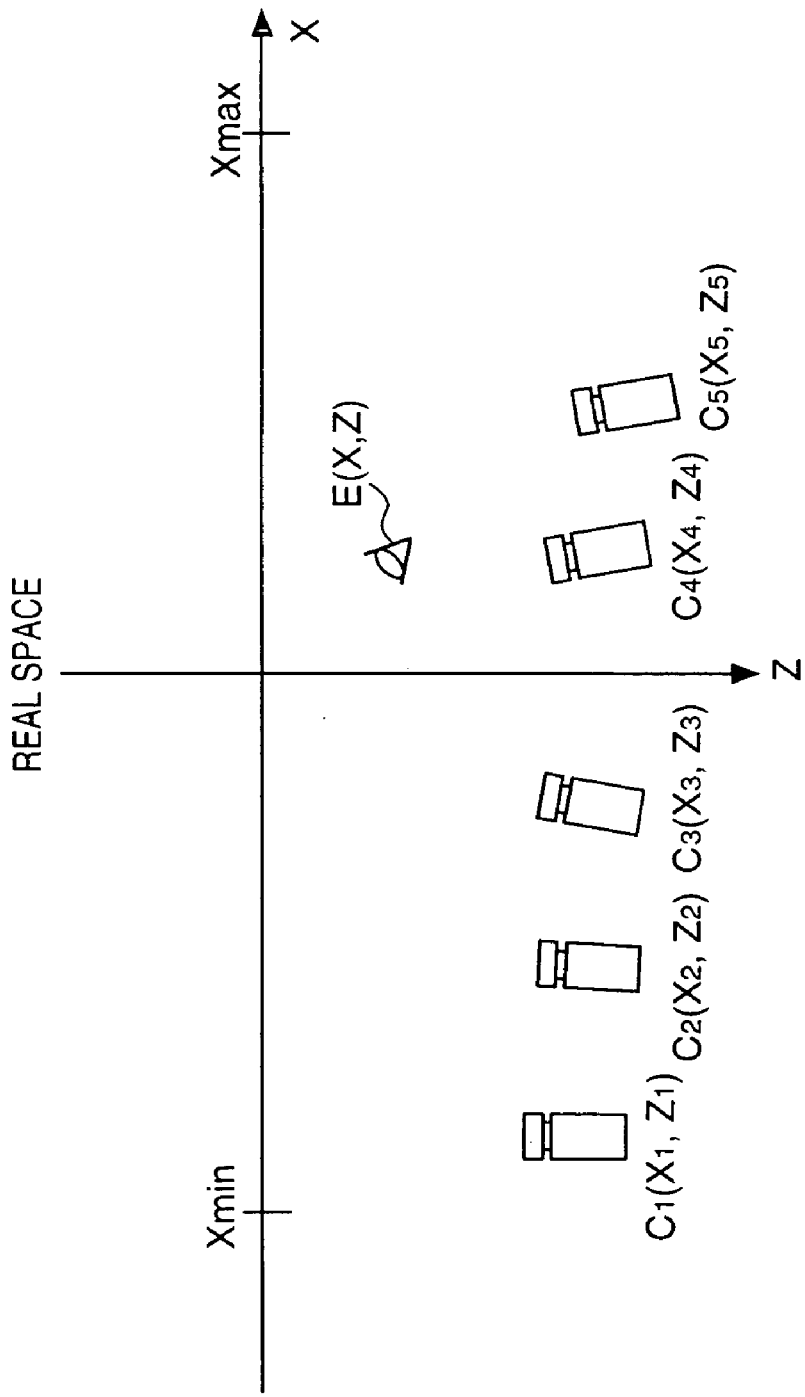
FIG. 7 is a view for explaining the principle of reconstructing a real space from an arbitrary viewpoint in FIG. 6.

This system presents a virtual space to the user on a CRT 23. The user can freely walk through that virtual space or can manipulate (move, rotate, enlarge, or the like) an object in the virtual space by operating a mouse 28. More specifically, an object in the real space is converted into ray space data on the basis of a photo image, and the converted data is stored in advance in a disk 25. When the viewpoint position moves as the user walks through, a ray space data object image at the moved viewpoint position is generated, as has been explained with reference to FIG. 7. This image is mapped on a transparent plate laid out in the virtual space by a texture mapper 24, and the entire virtual space including the mapped image is rendered and displayed on the CRT 23. The texture mapper 24 also maps the texture of a shadow to a transparent plate laid out on the bottom portion of the object.

Figure 9:
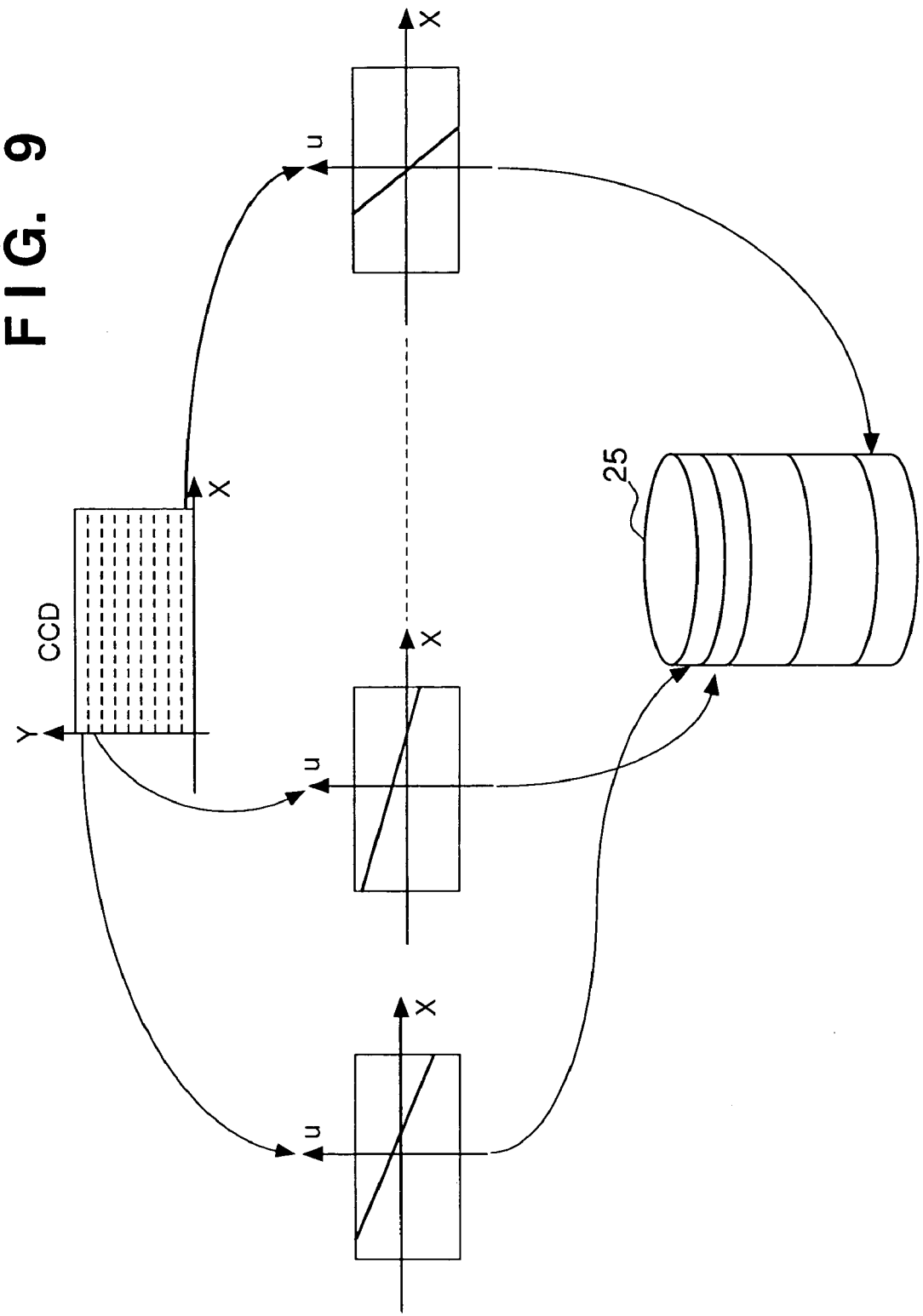
FIG. 9 is a view for explaining storage of ray space data in the first embodiment.

FIG. 9 explains the recording method of ray space data stored in the disk 25 in this system. That is, as has been explained in FIGS. 1 to 7, ray space data expressed by a single line in an (X, u) space corresponds to a photo image that was converted in this line image.

Referring to FIG. 8, reference numeral 29 denotes a color camera for obtaining a photo image. The camera 29 is mounted on a moving mechanism 30, and a CPU 20 drives the moving mechanism 30 in accordance with a control program (to be described later) to move the position of the camera 29. The CPU 20 can detect the moved position of the camera, i.e., the moved viewpoint position (including posture), via the moving mechanism 30. Reference numeral 32 denotes an illumination light source. This light source is moved to an arbitrary position via a moving mechanism 31. The moved position is detected by the CPU 20.

The camera 29 and, especially, the illumination light source 32 are movable to sense shades generated by illuminations (real illuminations) at a plurality of known positions. This system generates ray space data with shades in advance on the basis of real shade images. Also, this system holds silhouette images of an object viewed from the light source positions as a shadow image database.

Generation of Shades by Virtual Illumination

Figure 10:
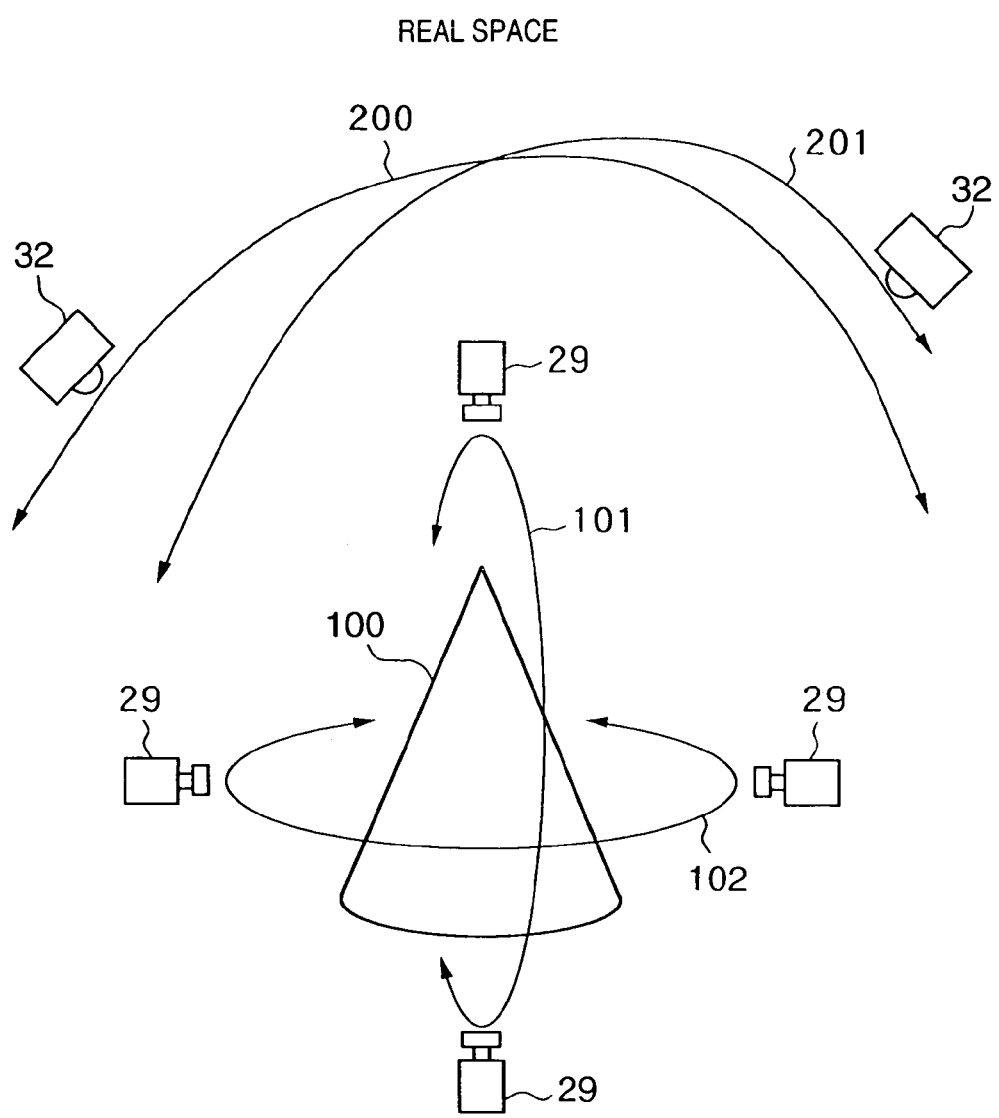
FIG. 10 is a view for explaining a scheme for obtaining a photo image with shades of an object at each of a plurality of different camera viewpoints when the object is illuminated from a plurality of different illumination positions.

FIG. 10 explains the principle of capturing shade data. Referring to FIG. 10, reference numeral 100 denotes a real object, which is a circular cone 100 in this example, for the sake of simplicity. Also, in FIG. 10, reference numerals 101 and 102 denote image sensing routes, along which a plurality of image sensing positions are designated. In the example shown in FIG. 10, the route 101 vertically makes a round of the circular cone 100, and the route 102 horizontally makes a round of the circular cone 100. For example, when the circular cone 100 is sensed at 36 points of viewpoint positions in 10° increments along the route 101 (one round =360°), 36 images of the circular cone 100 can be obtained, and these 36 color images are those of the object 100 with shades. The sensed images are converted into ray space data by the aforementioned method, and are stored in the disk 25.

Referring to FIG. 10, reference numerals 200 and 201 denote moving routes of the illumination light source 32. The moving routes 200 and 201 have, e.g., semi-circular arcuated shapes, and are perpendicular to each other. That is, the routes 200 and 201 respectively have 180° moving ranges. Assuming that the light source 32 moves in 10° increments, 18 points of illumination positions for each of the routes 200 and 201 (a total of 36 points) can be obtained.

As will be described later, the number of illumination positions influences the precision of the shapes of shades and shadow. Hence, the 10° increment width along each of the horizontal and vertical image sensing routes is merely an example, and the increment width can be arbitrarily increased/decreased as needed.

Figure 11:
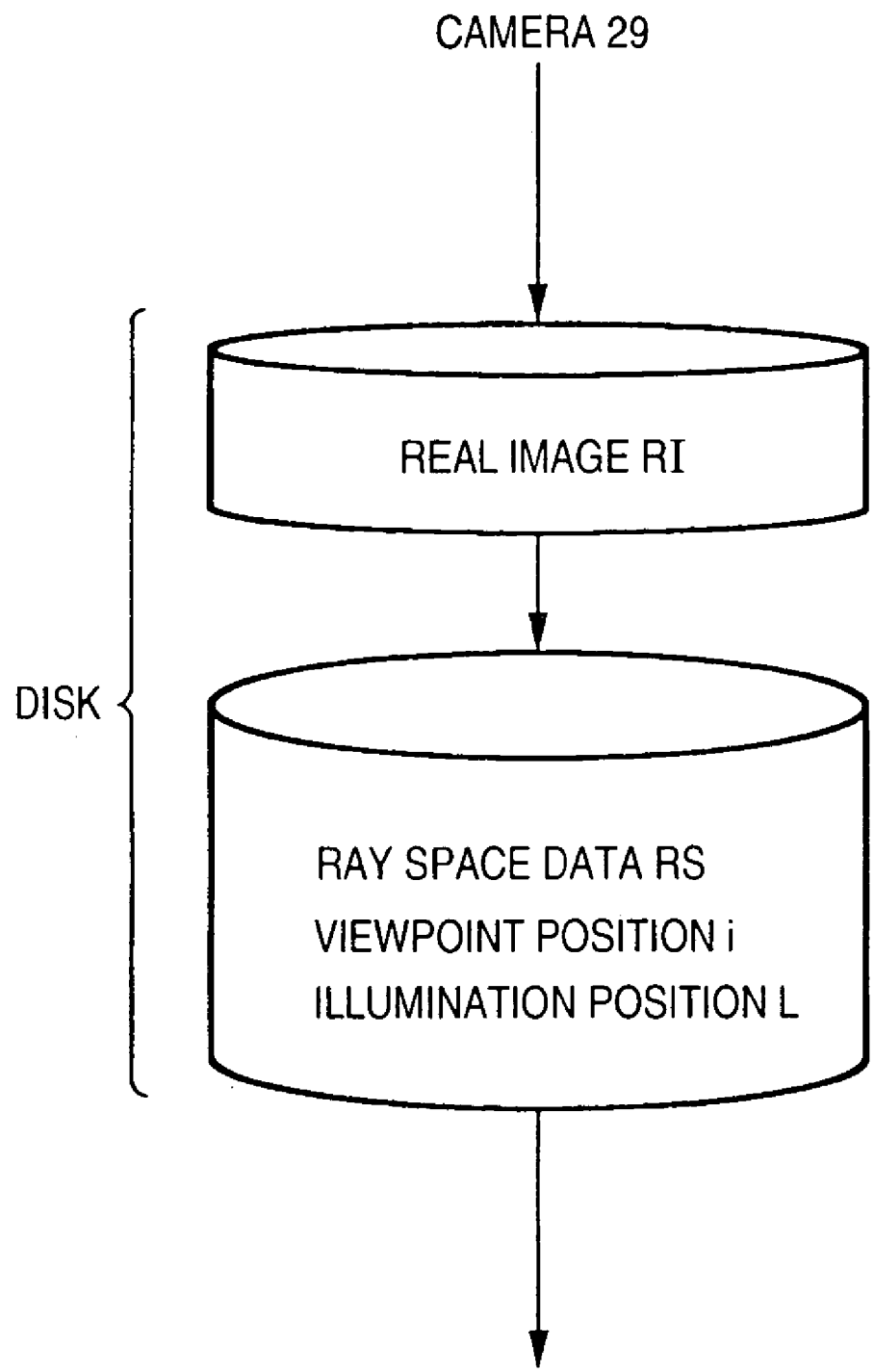
FIG. 11 is a chart for explaining the process for generating ray space data of a photo image with shades of an object.

In this example, ray space data are respectively generated at 36 points of illumination positions. Each ray space data are generated from 36 images. If RS represents one object, the object RS can be expressed by RS(L) since it has an argument L of an illumination position. FIG. 11 illustrates a state wherein a real image $RI_i(L)$ (i is the viewpoint position along the route 101 or 102) obtained by sensing the real object 100 illuminated from the illumination position L by the camera 29 is temporarily stored in the disk 25 and is converted into a ray space data object RS(L), and the converted object is stored.

Figure 12:
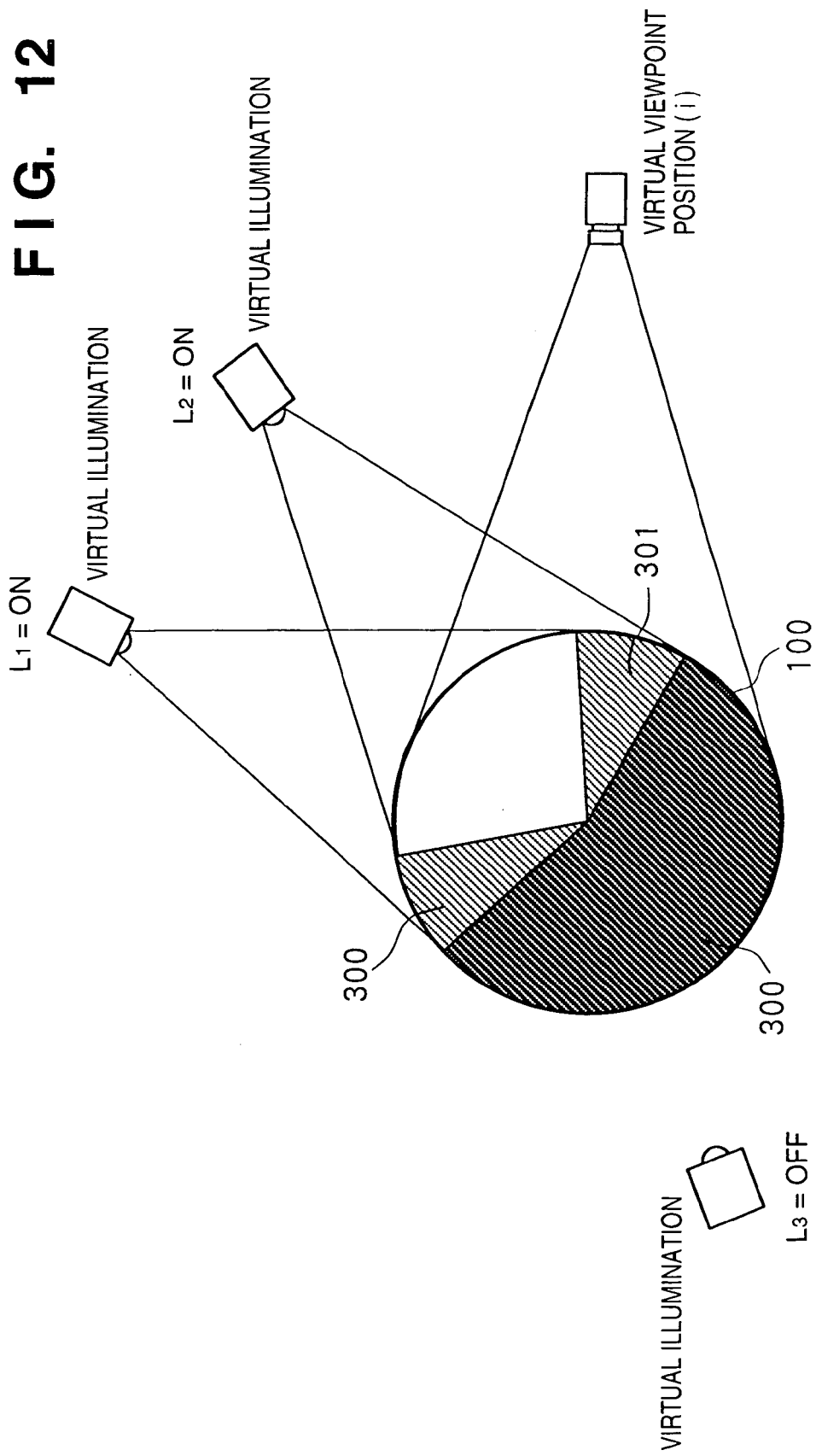
FIG. 12 is a view for explaining generation of shades of a virtual object illuminated by virtual illuminations placed at $L_1$ and $L_2$ when viewed from virtual viewpoint position i.
Figure 13:
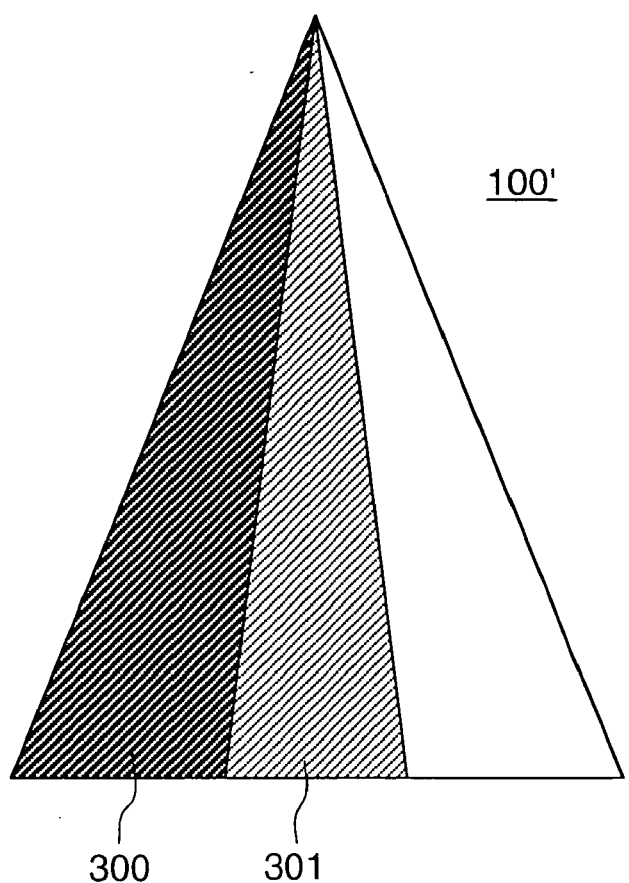
FIG. 13 is a view for explaining shades added to the virtual object shown in FIG. 12.
Figure 14:
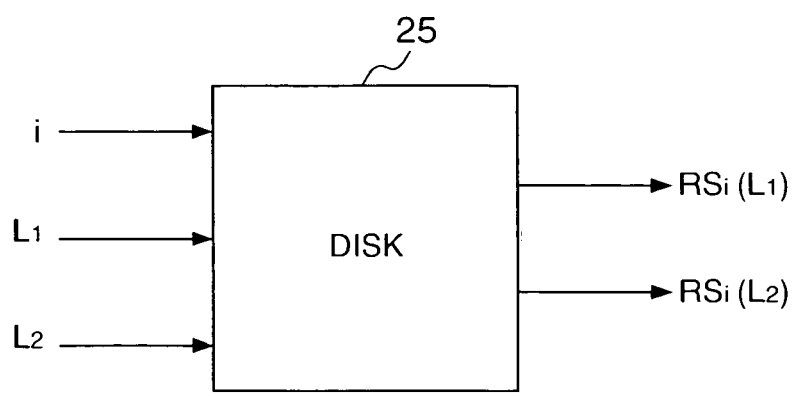
FIG. 14 is a view for explaining a scheme for extracting ray space data RS corresponding to viewpoint position i and illumination positions $L_1$ and $L_2$ from data stored in a disk.

FIG. 12 explains a scheme for generating shades upon rendering a virtual image 100' of the object 100 at a certain viewpoint position in a virtual space with a plurality of virtual illuminations. In the example shown in FIG. 12, three virtual illuminations ($L_1$, $L_2$, $L_3$) are set in the virtual space, and the virtual illuminations ($L_1$, $L_2$) are ON, and the virtual illumination ($L_3$) is OFF. Then, light shades must be formed on regions 300 and 301 of the surface of the circular cone 100 as a virtual object, and a dense shade on a region 302. When the virtual object 100 formed with such shades is viewed from virtual viewpoint position i, a virtual image shown in FIG. 13 should be obtained by rendering. In order to implement such rendering, a ray space data object image $RS_i(L_1)$ generated at viewpoint position i by setting a light at the illumination position $L_1$ and a ray space data object image $RS_i(L_2)$ generated at viewpoint position i by setting a light at the illumination position $L_2$ can be mixed, as shown in FIG. 14.

Figure 15:
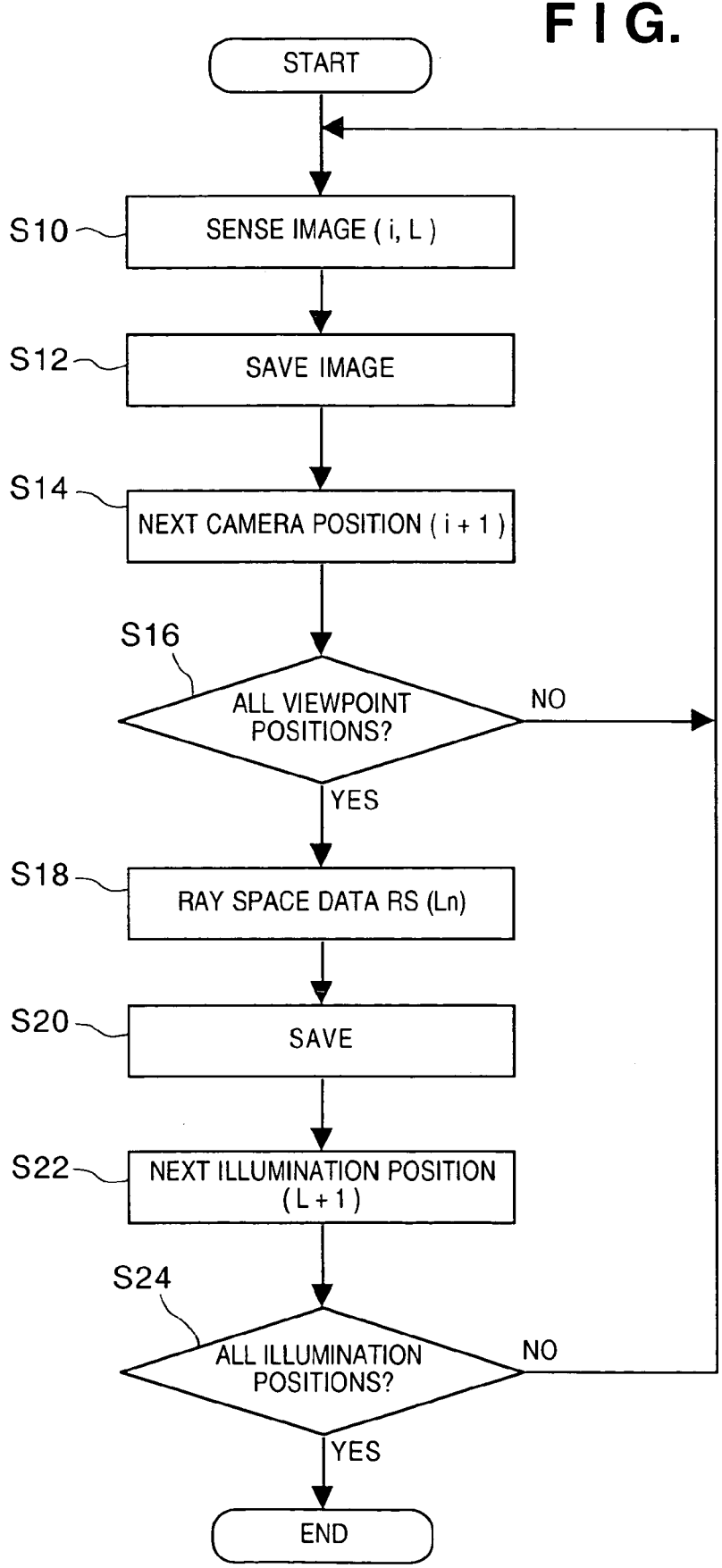
FIG. 15 is a flow chart showing the control sequence until a photo image with shades of an object is captured and is converted into ray space data.

FIG. 15 is a flow chart for explaining the storage sequence of ray space data according to the first embodiment. An image of a real object illuminated by an illumination $L_n$ is captured at camera viewpoint position i (step S10), and the captured image is saved (step S12). This operation is repeated for all a plurality of predetermined viewpoint positions i (steps S14 and S16). The plurality of image data obtained in step S10–S16 are converted into ray space data $RS(L_n)$ of the illumination $L_n$ (step S18), and the converted data are saved in the disk 25 (step S20). The aforementioned process is repeated for all the illuminations (steps S22 and S24). In this manner, the camera 29 is directed to the real object at each of a plurality of camera viewpoint positions i, the real object is illuminated from each of a plurality of illumination positions $L_n$ to capture images of the real object, the captured image data are converted into ray space data RS in units of illumination positions $L_n$, and the converted data are saved in the disk 25 as shown in FIG. 36.

Figure 18:
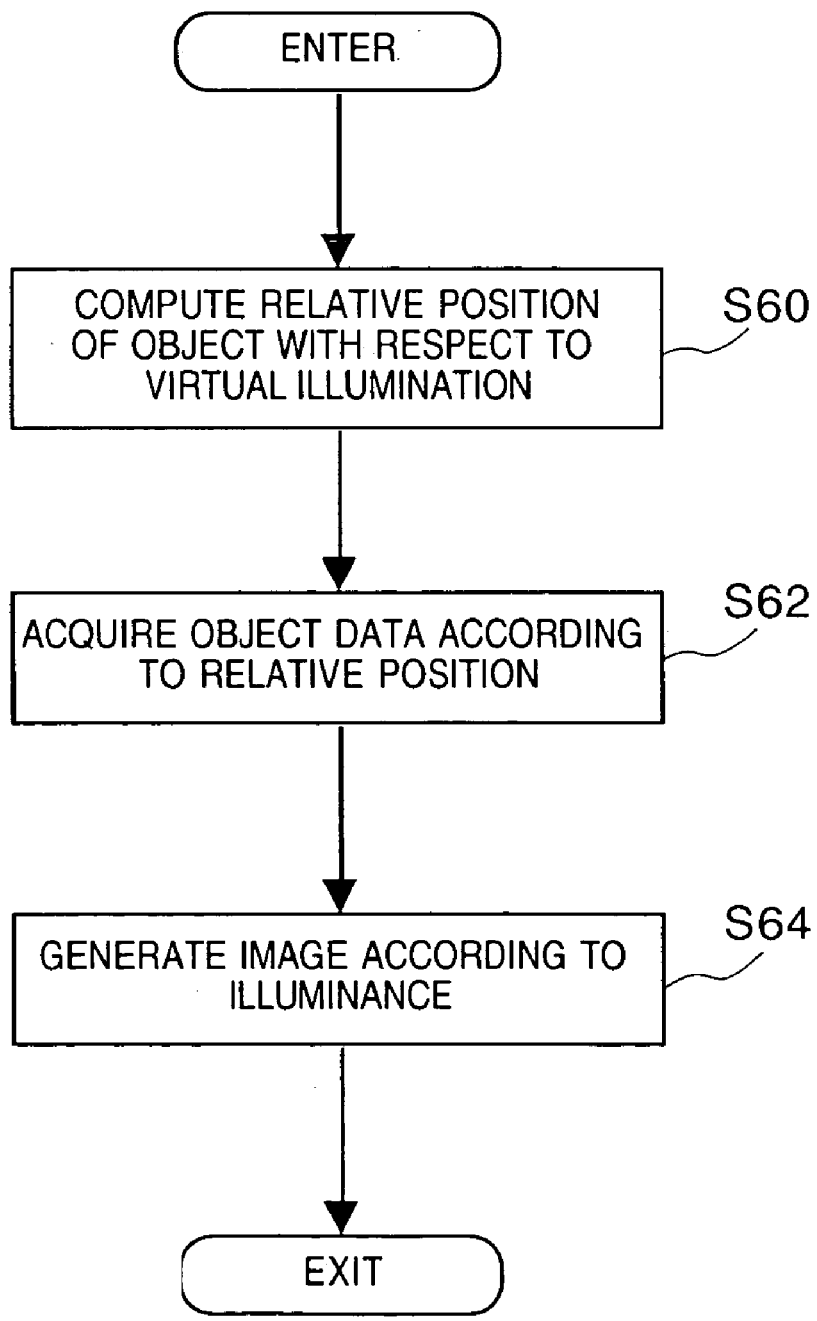
FIG. 18 is a flow chart for explaining a rendering routine in FIG. 17.

As explained later, appropriate ray space data can be obtained by searching the table shown in FIG. 36 based on relative position between the object and the virtual illumination (step S62 of FIG. 18).

FIG. 16 shows various illumination conditions of the illumination device at the individual illumination positions. These illumination conditions were recorded upon storing ray space data of a real image. When an application program of this image processing system implements walkthrough in a virtual space, it virtually turns on/off the respective illuminations (virtual illuminations) in accordance with its specifications or by receiving a user instruction upon rendering a virtual object in the virtual space. That is, as has been explained above in relation to FIGS. 12 and 13, an image of a virtual object with shades is rendered considering the sum of the contributions of all ON illuminations.

Figure 17:
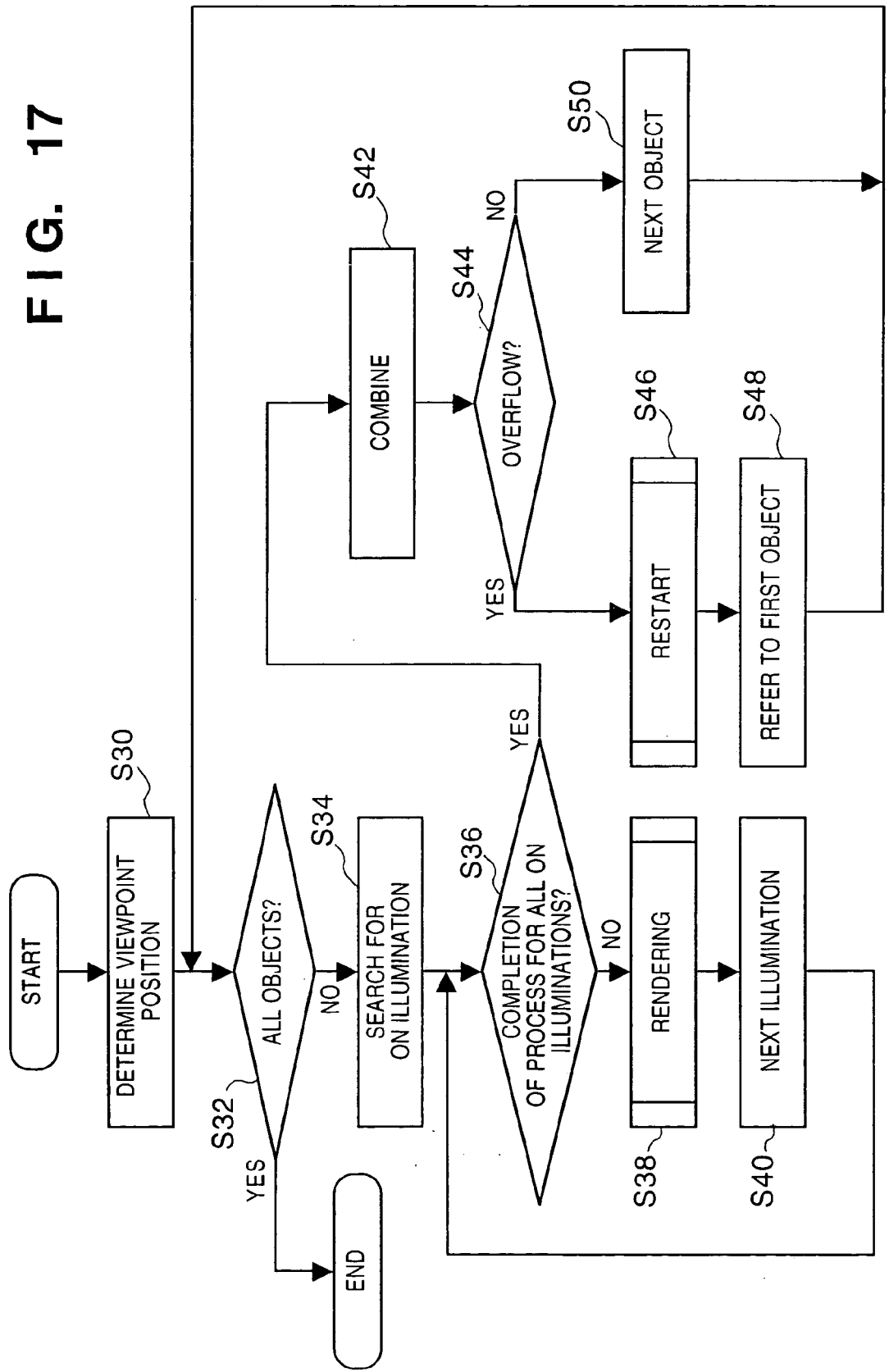
FIG. 17 is a flow chart showing the control sequence for generating an image with shades of a virtual object when an arbitrary virtual illumination is set.

FIG. 17 shows the control sequence for rendering an image by that application program.

In step S30, viewpoint position i to be rendered is determined. It is checked in step S32 if rendering of ray space data objects pre-stored in correspondence with viewpoint position i of interest is complete. If rendering is not complete, the flow advances to step S34, the table shown in FIG. 16 is searched for virtual illuminations the user (or the application program) wants to turn on. Processes in steps S38 and S40 are done for a ray space object $RS(L_{ON})$ corresponding to a designated ON virtual illumination. Note that $L_{ON}$ is the number of a designated ON virtual illumination. FIG. 18 shows the rendering process in step S38 in detail.

Figure 20:
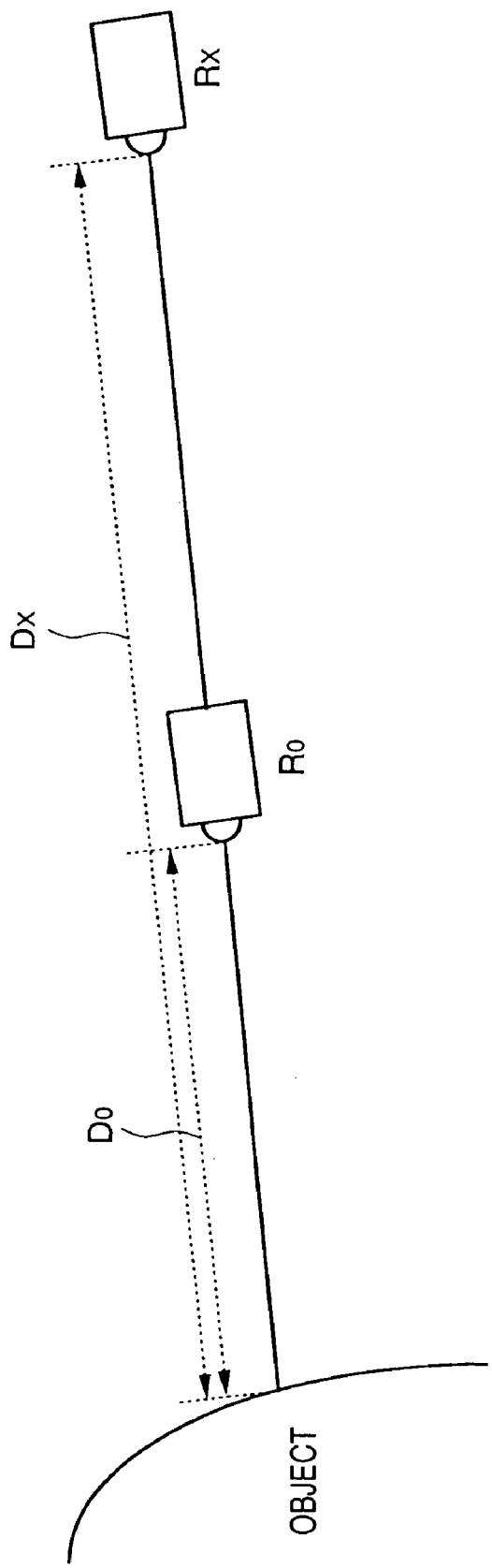
FIG. 20 is a view for explaining the principle of controlling the pixel value in accordance with the illumination position with respect to an object.

If $L_n$ represents the number of the ON illumination, steps S60 to S64 process an object $RS(L_n)$. That is, the relative position of the object with respect to the illumination $L_n$ is computed in step S60, and object data is acquired by searching the table shown in FIG. 36 in accordance with that relative position in step S62. In step S64, an image of the object $RS(L_n)$ is generated in consideration of illuminance of the illumination $L_n$. For each of R, G, and B values which do not consider any illumination, the pixel value of is changed larger with increasing illuminance value and decreasing distance to the illumination. That is, as shown in FIG. 20, considering the illuminance ($R_0$) and position (i.e., distance $D_0$) of a real illumination, with respect to a virtual illumination (illuminance $R_x$, distance $D_x$) located in the same direction as the real illumination, a pixel value $P_x$ of a virtual image is given by:

$$P_x = f(P, D_x, D_0, R_x, R_0)$$

where P is the pixel value of a real image, and f is a predetermined function.

In this manner, rendering of an object is completed.

Referring back to FIG. 17, the next ON illumination is referred to in step S40, and the flow returns to step S36 to repeat processes in step S38→step S40.

Figure 19:
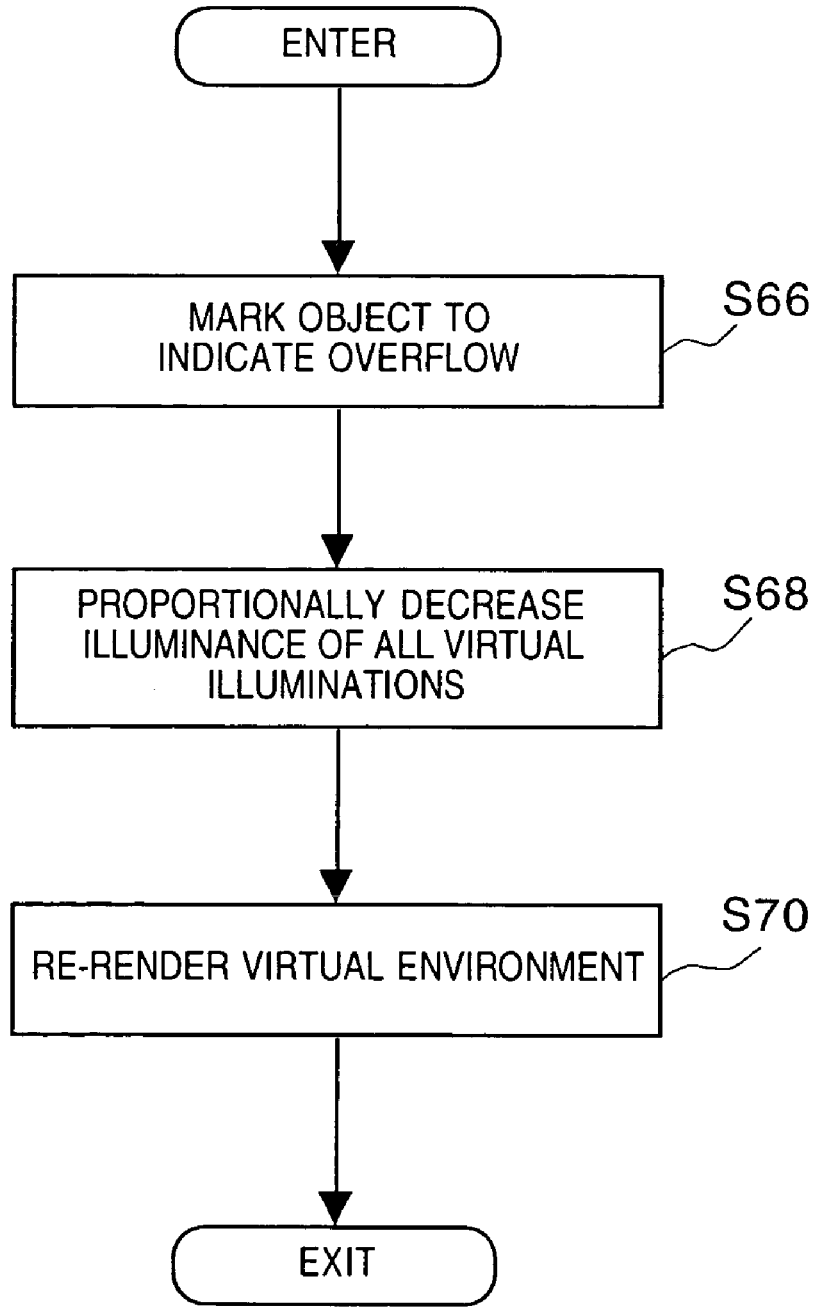
FIG. 19 is a flow chart for explaining a restart routine in FIG. 17.

Upon completion of the process in step S38 for all ON virtual illuminations, the flow advances to step S42 to compute the sum of pixel values of that pixel computed for the respective virtual illuminations. In this case, the sum of pixel values can be obtained by simply adding the pixel values of the respective generated images at the corresponding pixel position. It is checked in step S44 if the sum of pixel values computed in step S42 overflows, i.e., exceeds the gamut of the display device (CRT 23). If YES in step S44, a restart process is done in step S46. In the restart process, the illuminance of the virtual illumination is decreased not to cause any overflow, and rendering is redone. FIG. 19 shows details of the restart process.

In step S66, objects are marked to indicate overflow. In step S68, the set illuminance values of all the virtual illuminations (see the table in FIG. 16) are decreased. In step S70, a virtual environment is rendered again.

On the other hand, if it is determined in step S44 that no overflow is detected, the next object is referred to in step S50, and the flow returns to step S32. If YES is determined in step S32, ray space data have been processed for all pixels for one frame, and as a result, a virtual image under a condition that two virtual illuminations are ON (FIG. 12) is generated, as shown in, e.g., FIG. 13.

Effect of Shade Addition

As described above, according to shade generation of this embodiment, shades from an illumination at a desired position can be appropriately generated even for a virtual object expressed by IBR data (having no geometric shape information) of the ray space theory or the like.

Addition of Shadow by Virtual Illumination

The image processing apparatus of this embodiment also has a function of adding a shadow by a virtual illumination in addition to addition of shades by the virtual illumination. The shape of a shadow is dominated by the geometric shape of an object and the shape of a plane (to be referred to as a "mapping plane" hereinafter) on which the shadow is projected. However, since an IBR image such as ray space data or the like does not have any geometric shape for an object, it is conventionally difficult to implement processes pertaining to a shadow, as described early. The image processing apparatus of this embodiment generates a shadow image in advance like in shading. The mapping plane is generated using a so-called "bounding box" known to those who are skilled in the CG art.

Figure 21:
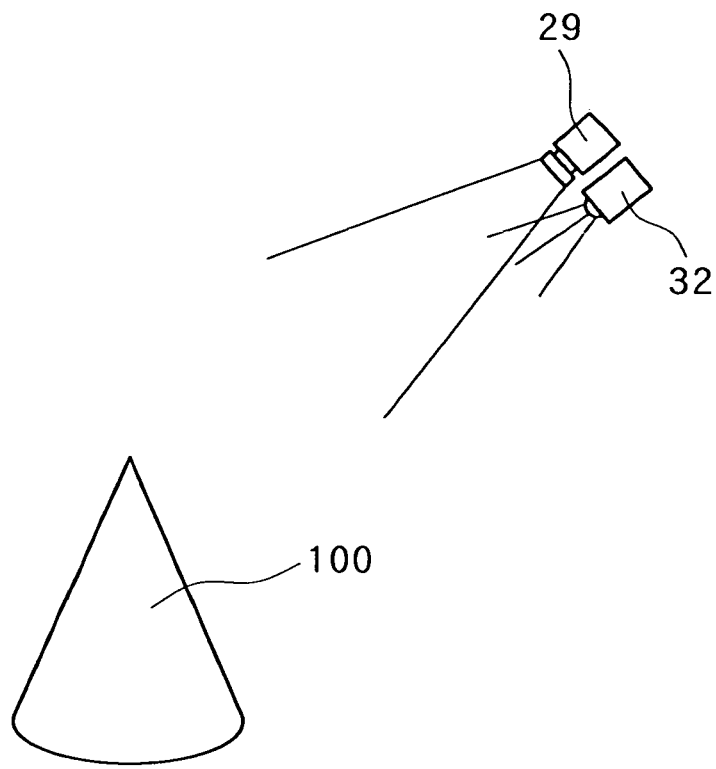
FIG. 21 is a view for explaining the principle of generating a silhouette serving as a source of a shadow image of an arbitrary object.
Figure 22:
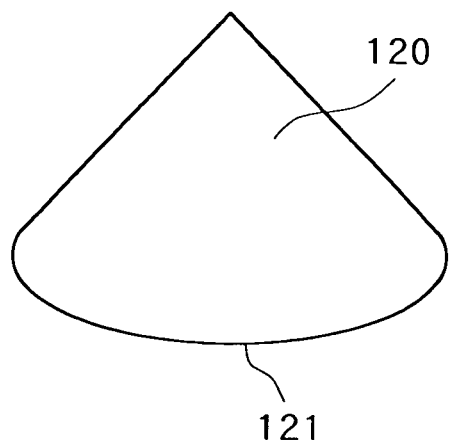
FIG. 22 is a view showing an example of the silhouette extracted by the principle of FIG. 21.

FIGS. 21 and 22 illustrate the principle of a scheme for generating shadow data of the circular cone 100 as an example of a real object.

More specifically, when an illumination 32 illuminates a real circular cone 100 from the position in FIG. 21, the camera 29 is set at a position substantially matching that (including a posture) of the illumination 32 to sense an image of the object 100 illuminated by the illumination 32. This image 120 has a shape, as shown in, e.g., FIG. 22, and its silhouette 121 should have a shape approximate to a shadow generated when the object 100 is illuminated by the illumination 32. In other words, when shades are generated, an image is sensed by the camera to record photo images of the object added with shades in the form of ray space data in advance. But upon generating a shadow, an image of the object is sensed to obtain a shadow image.

Figure 23:
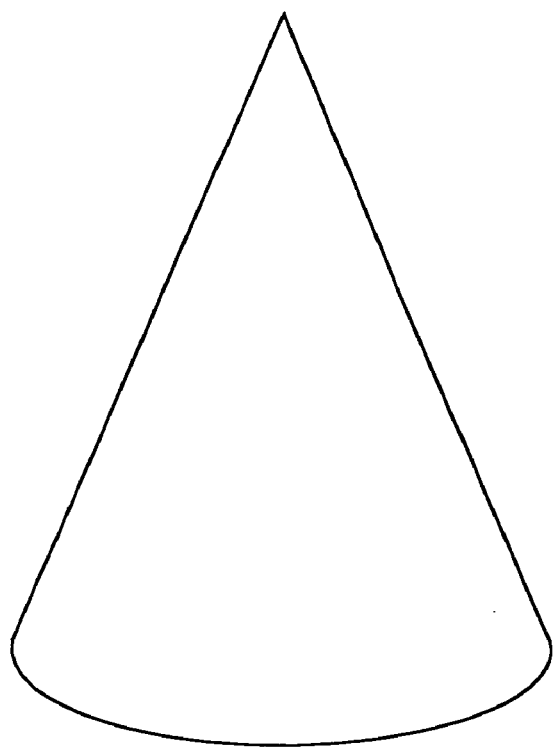
FIG. 23 is a view for explaining a change in silhouette obtained by FIG. 22 with changing virtual illumination position (to be lower)
Figure 24:
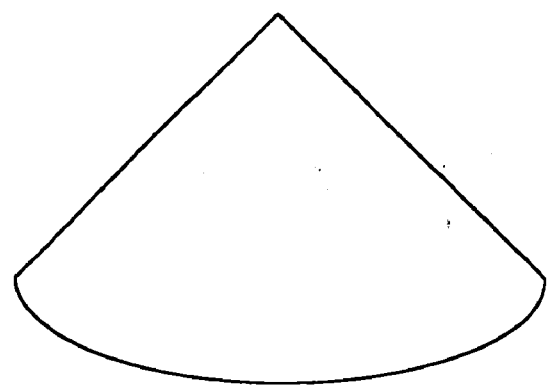
FIG. 24 is a view for explaining a change in silhouette obtained by FIG. 22 with changing virtual illumination position (to be higher)

The silhouette 121 serves as a basis of a shadow image, and will be simply referred to as an "edge shape" hereinafter. A shadow formed by a virtual illumination (i.e., a virtual shadow) can be obtained by computing the coordinate transform of the silhouette to have the viewpoint position of the virtual illumination as a coordinate axis, i.e., the affine transform. For example, when the angle of elevation of the virtual illumination is low, an elongated shadow should be generated, as shown in FIG. 23; when the angle of elevation is high, a shadow with a short length should be generated, as shown in FIG. 24.

The shape of a shadow is influenced by the shape of the mapping plane in addition to the silhouette shape. When the mapping plane is determined, the shadow shape is obtained by projecting the silhouette onto the mapping plane. This projected shape is expressed by an affine transform.

The principle of generating the mapping plane will be explained below.

A shadow of an object has a shape corresponding to the shape of said object. That is, a shadow is formed within a range corresponding to the shape of an object. A feature of this embodiment is to limit the shape (i.e., range) of the mapping plane to that of the mapping plane of the bounding box of an object (virtual object).

Figure 25:
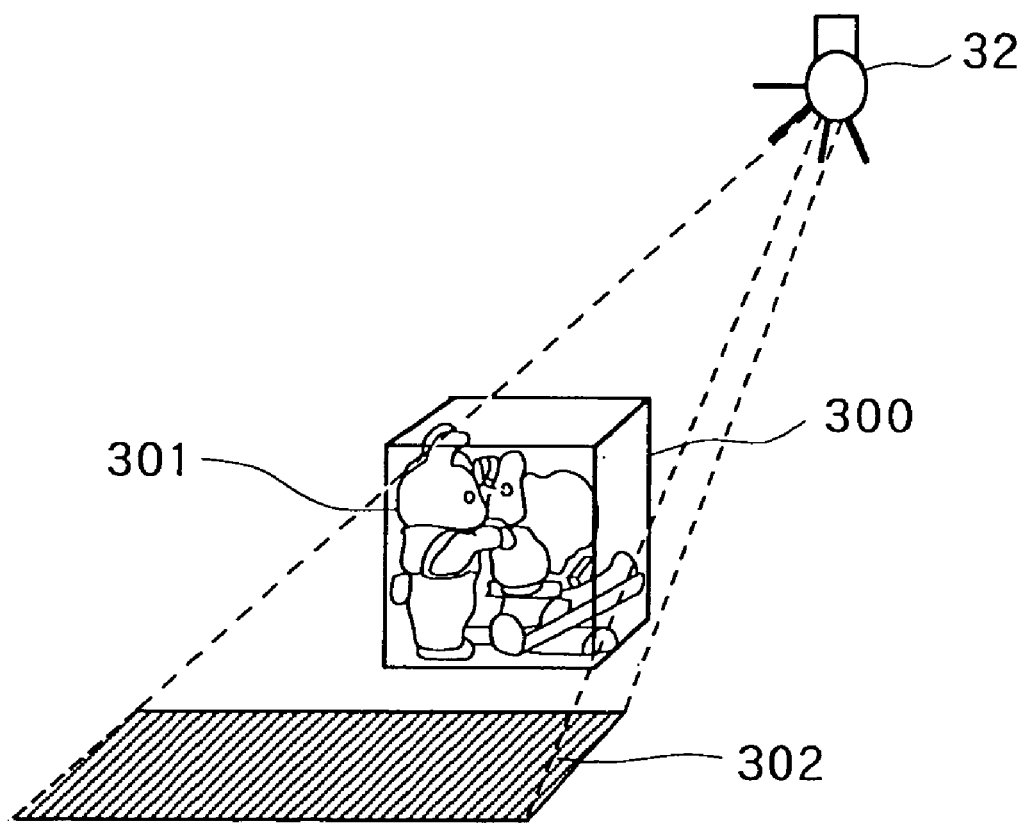
FIG. 25 is a view for explaining the principle of generating a mapping plane in the first embodiment.

For example, when virtual images of two animal toys 301 having complicated geometric shapes in practice are present, as shown in FIG. 25, a bounding box that includes all spatial spreads of these virtual images is obtained. This box is normally set to have a rectangular parallelopiped shape, and is a box 300 in the example shown in FIG. 25. A projected shape 302 of this box is a rectangle, as shown in FIG. 25. This projected shape 302 serves as the mapping plane.

Figure 26:
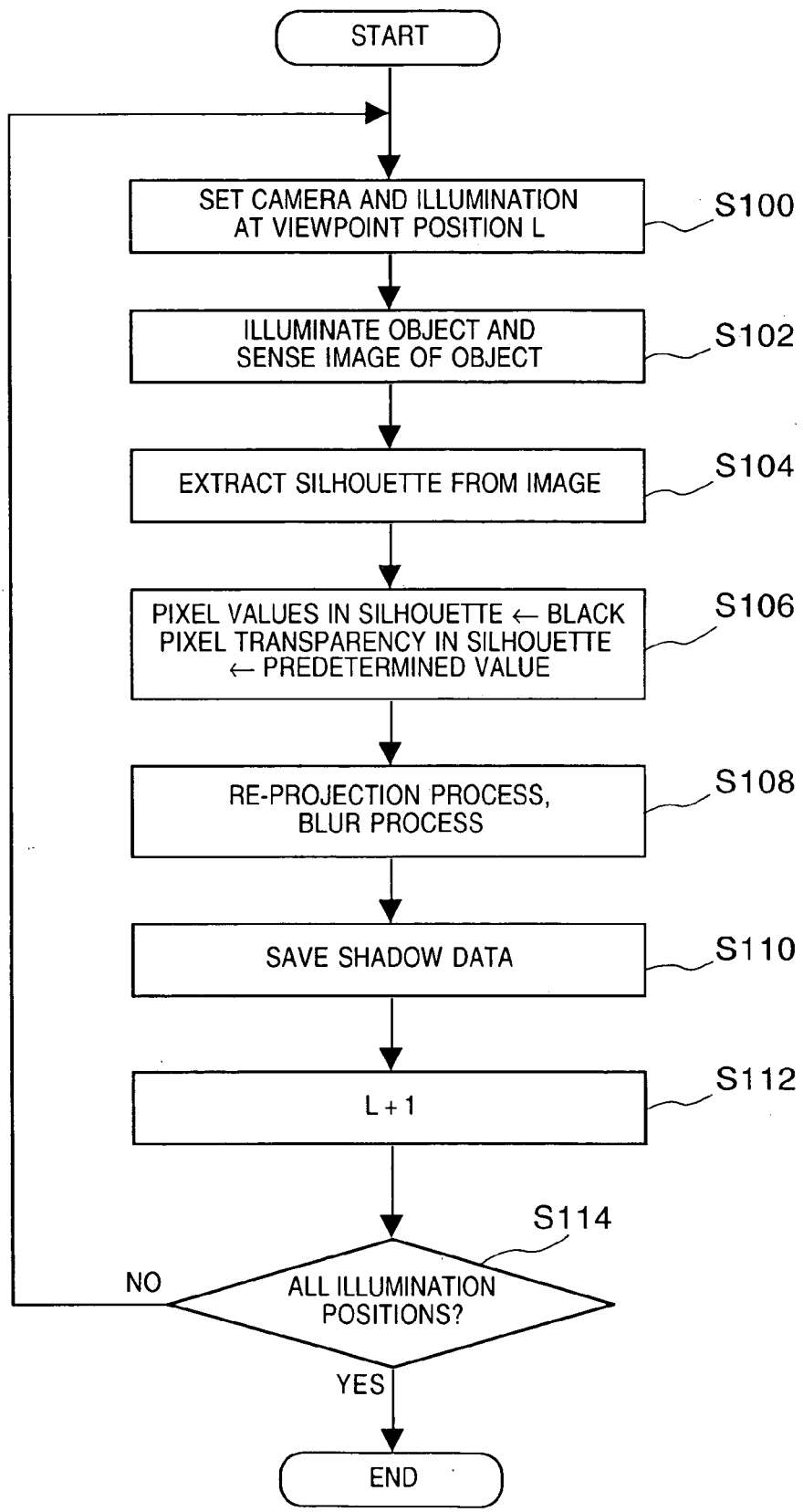
FIG. 26 is a flow chart showing the control sequence for generating a shadow image beforehand.

FIG. 26 shows the control sequence for obtaining the edge shape.

In step S100, the camera 29 and illumination device 32 are set at an arbitrary position L. In step S102, a real object is illuminated by the illumination 32 at this position L to capture its image. In step S104, a silhouette is acquired from that image. In step S106, pixel values in that silhouette are set to be black. Also, the transparency is set at a predetermined value (which does not indicate 100% transparency but allows to see through the surface of the virtual object).

A process in step S108 is selectively done. That is, if the image sensing plane (the camera position/posture) is not parallel to the projective plane (illumination position/posture), a re-projection process of a shadow image is required. However, in the example shown in FIG. 21 since these planes are not parallel to each other and the angle these planes make is small, errors are expected to be small, and little difference is observed if such re-projection process is not done. When a silhouette is obtained not from a real object but from a virtual object, the perspective viewing volume can be set so that the rendering plane matches the plane of a shadow image.

A blur process in step S108 considers the fact that an actual shadow is blurred at its edge portion. That is, by adding the blur process, a shadow image can look more natural. Furthermore, by increasing the blur value for a shadow projected at a position farther from the object, the natural feel can be further enhanced. When this blur process is done for an silhouette image generated from an image of a virtual object, it can be implemented using a jittered viewing volume used upon rendering an image using a depth-of-field effect.

In step S110, the obtained shadow image data is saved. In step S112, the next image sensing position (illumination position) L+1 is selected, and the processes in steps S100 to S112 are repeated until the processes are done for all the illumination positions.

Note that the shadow data is saved in step S110 to be indexed by the relative position value between the illumination and object as shown in FIG. 37.

In this manner, silhouettes obtained upon illuminating an object from a plurality of illumination positions can be prepared as shadow images.

Figure 27:
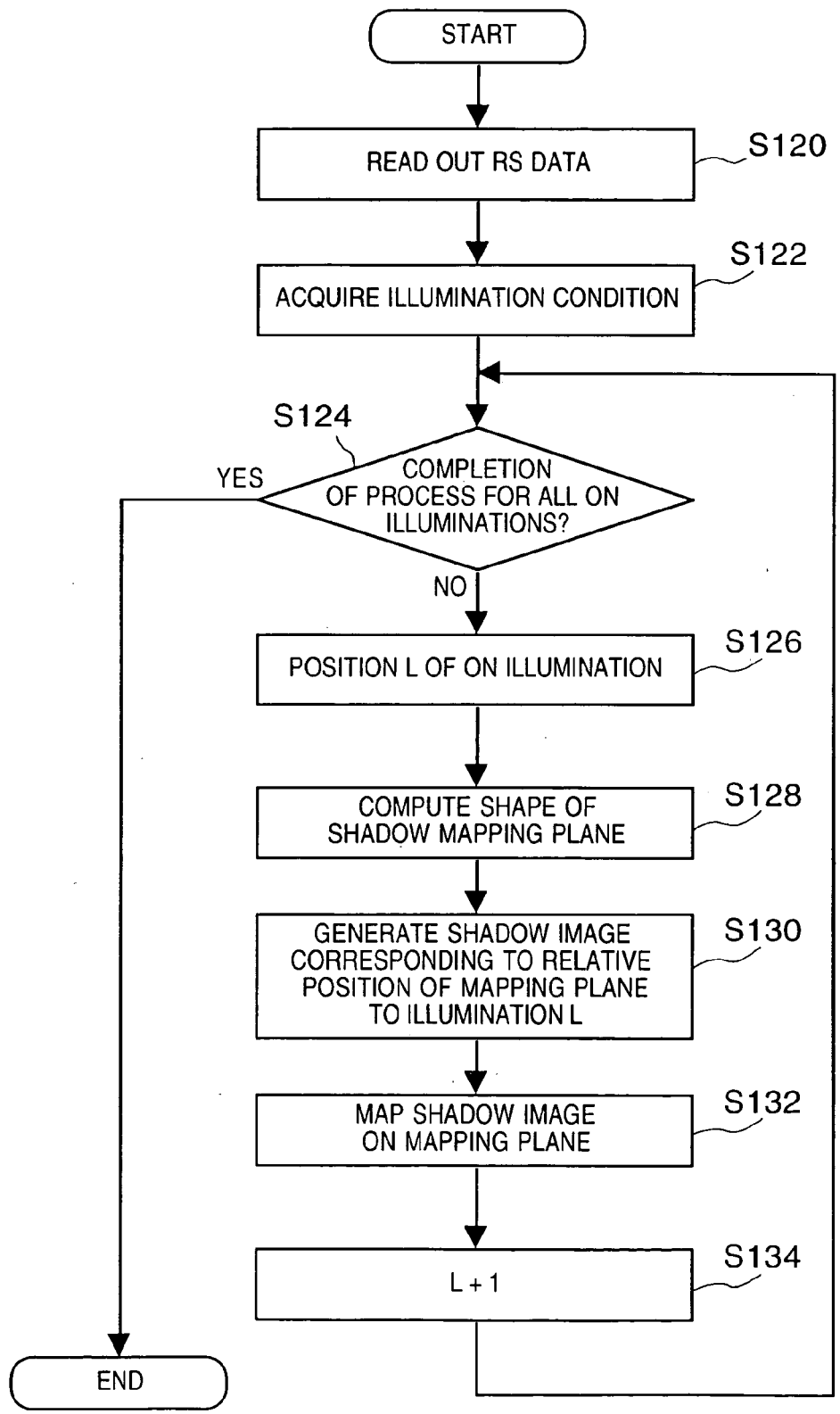
FIG. 27 is a flow chart showing the control sequence for pasting a shadow image generated beforehand to a virtual object.

FIG. 27 explains the sequence for rendering a shadow in detail.

More specifically, ray space data of a virtual object for which a shadow is to be generated is read out from the memory in step S120.

In step S122, all virtual illuminations that may generate shadows are detected. Steps S126 to S134 implement a rendering process of a shadow image formed by an ON illumination of those detected virtual illuminations. More specifically, one ON illumination L is found in step S126. In step S128, the shape of the mapping plane is computed. The shape of the mapping plane can be computed if the geometric shape of the bounding box of a virtual object and the relative position of a light source are given, as described above. The geometric shape of the shadow mapping plane can be set so that an arbitrary element in its bounding box has a shadow projected onto that mapping plane.

Figure 28:
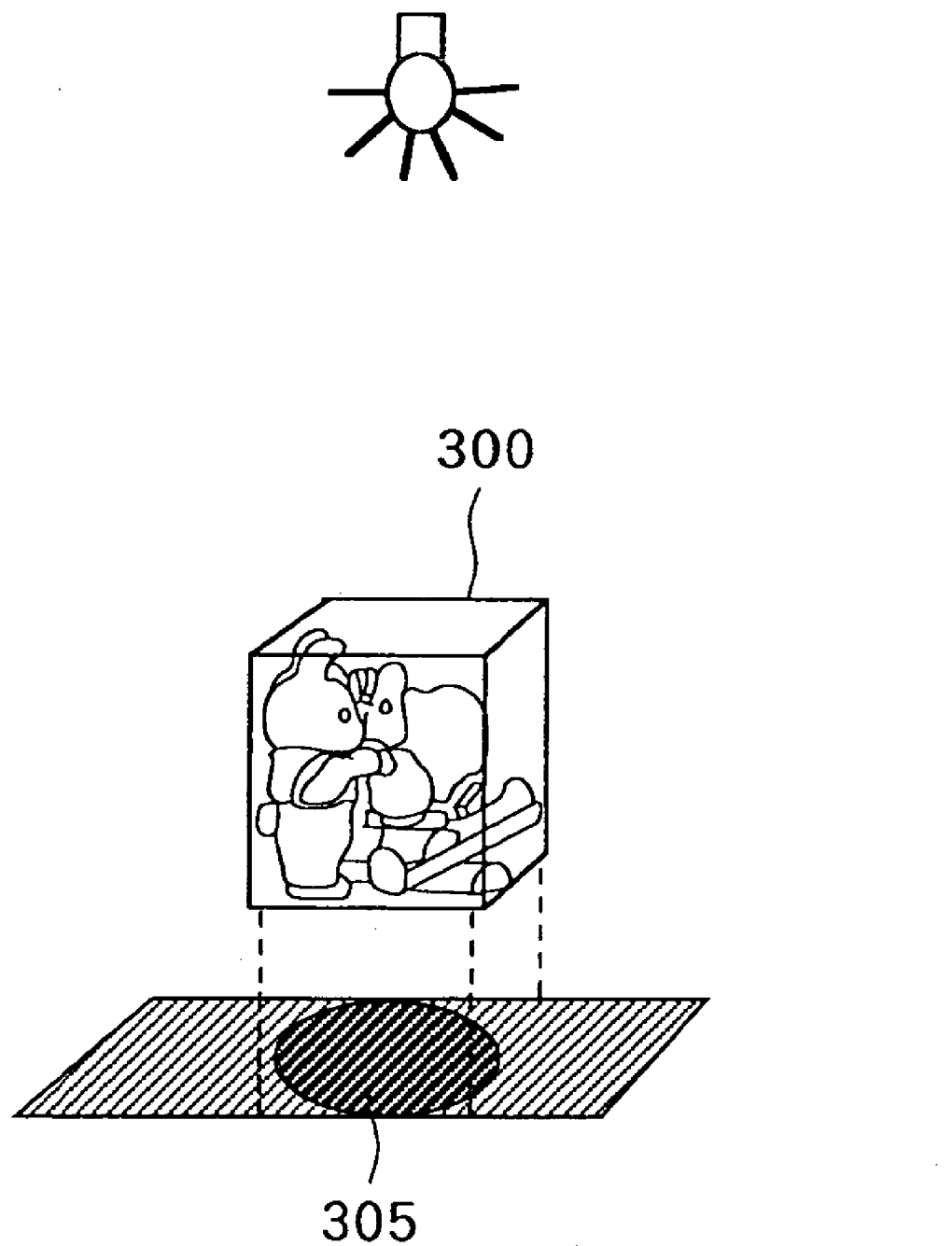
FIG. 28 is a view for explaining a method for generation of a simple shadow image.

Note that the bounding box used to determine the mapping plane can be used to create a simple shadow image in some cases. For example, when light reflected by a ceiling or external light serves as a light source, a very simple shadow image like an ellipse 305 that inscribes the bounding box can be used, as shown in FIG. 28.

In step S130, a shadow image is rendered in correspondence with the relative position of the object with respect to the illumination L. As has been described above in step S110, the shadow image is indexed by the value of the relative position of the real object (virtual object) with respect to the illumination L (see FIG. 37). Hence, an image corresponding to shadow data can be read out from the memory using the relative position. If required, re-projection and shadow image blur processes are executed. In step S132, the generated shadow image is mapped on the mapping plane. This mapping is implemented using texture mapping (24 in FIG. 8).

In step S134, the flow returns to step S124 to consider another illumination. If another ON illumination is available, in other words, if shadows formed by a plurality of illuminations may exist, the shadow images generated by the aforementioned scheme are mixed by known CG rendering (in consideration of semi-transparency of an image).

Effect of Shadow Generation

According to shadow generation of the above embodiment, a shadow formed by an illumination at a desired position can be appropriately generated even for a virtual object expressed by IBR data (having no geometric shape information) of the ray space theory or the like.

Various modifications of the present invention can be made.

In the above embodiment, ray space data are obtained by computations, but a RAM or ROM that stores them as a table may be used.

The display device is not limited to the CRT. For example, a lenticular or HMD type display device may be used.

The above embodiment has exemplified a method of holding in advance images sensed from all possible illumination positions. This is because ray space data objects used have only horizontal disparities but ignore vertical disparities. If a ray space data object can be generated in also consideration of the vertical disparity, an image of an object viewed from a given position of an illumination is generated using that ray space data object, and a silhouette can be rendered. In the ray space theory, not only the horizontal disparity but also vertical disparity can be provided, and such process can be implemented by expanding the aforementioned ray space data process pertaining to the horizontal disparity in the vertical direction. Hence, even when shadow data are not sensed in advance, the silhouette of an image viewed from an illumination position can be generated in real time using ray space data objects, and a shadow can be expressed by re-projecting the generated image.

When a plurality of illuminations are used, a silhouette image is generated at each illumination position, and shadows can be mixed by the scheme described in the above embodiment.

To restate, according to the present invention, shades can be appropriately added to a virtual object defined by space data based on a photo image.

Also, according to the present invention, a shadow can be appropriately mapped on a virtual object defined by space data based on a photo image.

Second Embodiment

A mixed reality presentation apparatus according to the second embodiment of the present invention will be described in detail below with reference to the accompanying drawings.

Figure 29:
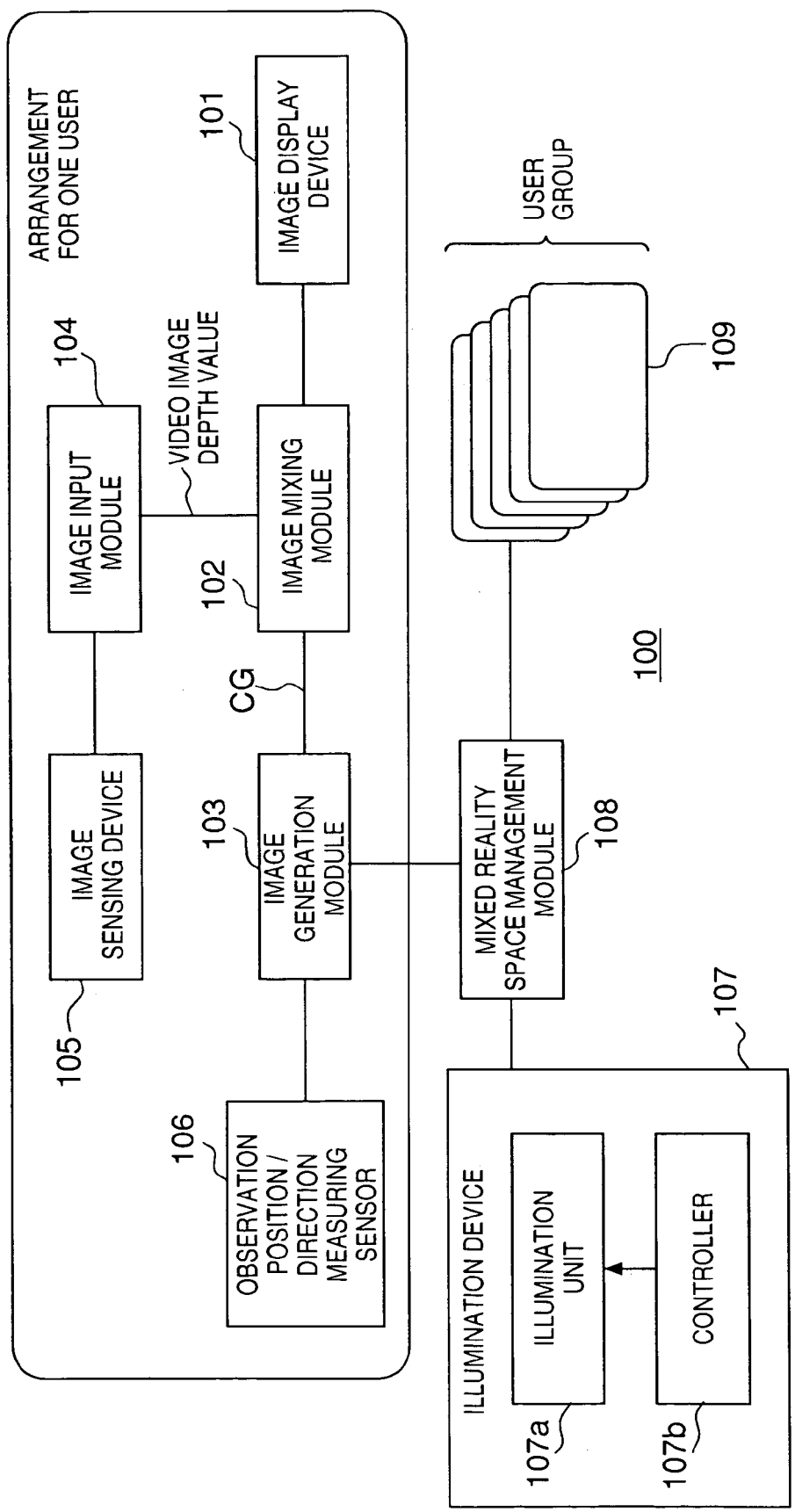
FIG. 29 is a block diagram for explaining the arrangement of a mixed reality presentation apparatus according to the second embodiment of the present invention.

FIG. 29 is a block diagram showing the overall arrangement of a mixed reality presentation system of this embodiment.

Referring to FIG. 29, reference numeral 106 denotes a sensor for measuring the viewpoint position and line-of-sight direction of the user. This sensor may be a magnetic or optical sensor provided outside user's body or a sensor attached to an HMD (Head Mounted Display) the user wears. The measured viewpoint position and posture are sent to an image generation module 103. The image generation module 103 generates a CG image in consideration of the viewpoint position and line of sight of the user.

On the other hand, an image sensing device 105 uses a video camera or the like for sensing an image of a real space. The image sensing device 105 is preferably attached to the head of the user when the viewpoint position and line-of-sight direction of the user change. An image input module 104 converts an image sensed by the image sensing device 105 into an object, also generates a depth value of a given object in that image, and passes them on to an image mixing module 102.

The image mixing module 102 mixes the CG image generated by the image generation module 103 with the video image from the image input module 104. In this mixing, as is well known, occlusion is determined by comparing the depth values of the CG image and video image, and a mask corresponding to a portion to be hidden of a behind object is generated, thus mixing the video and CG images.

Note that the image generation module 103 receives information that pertains to illumination conditions from a mixed reality space management module 108. That is, the image generation module 103 generates a CG with shades in accordance with the illumination conditions.

In this embodiment, a real illumination device 107 is used to illuminate an object. The management module 108 can change the illuminance, illumination direction, and the like of the illumination device. The management module 108 converts changed conditions of the illumination device 107 into predetermined parameter values, and passes them on to the image generation module 103.

Figure 30:
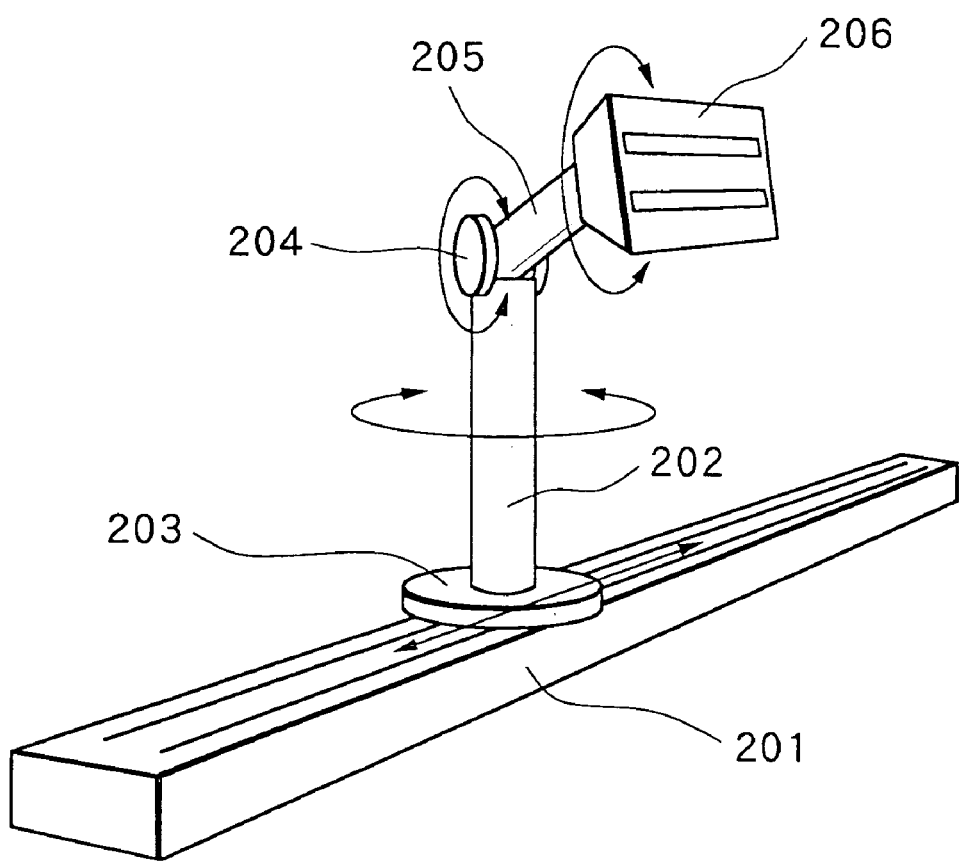
FIG. 30 is a view for explaining the arrangement of an illumination unit used in the apparatus of the second embodiment.

FIG. 30 shows an example of the illumination device 107. This illumination device has a light control unit 206, which is pivotally supported by a boom 205 via a joint (not shown). The boom 205 is fixed to a support shaft 202 via a joint 204. The support shaft 202 is pivotally fixed on a rotary stage 203, which is slidably placed on a slide table 201. Hence, the light control unit can slide, pan, tilt, and rotate. In addition, since the joints, rotary stage, and the like are driven by motors, they can be controlled by a signal from the management unit 108. Furthermore, the amount of light can be controlled by controlling the voltage/current to be applied to the light control unit. Also, since each motor, joint, slide table, and light control unit respectively have a rotary encoder, goniometer, linear distance sensor, and illuminance sensor, their position/posture information can be acquired.

Figure 31:
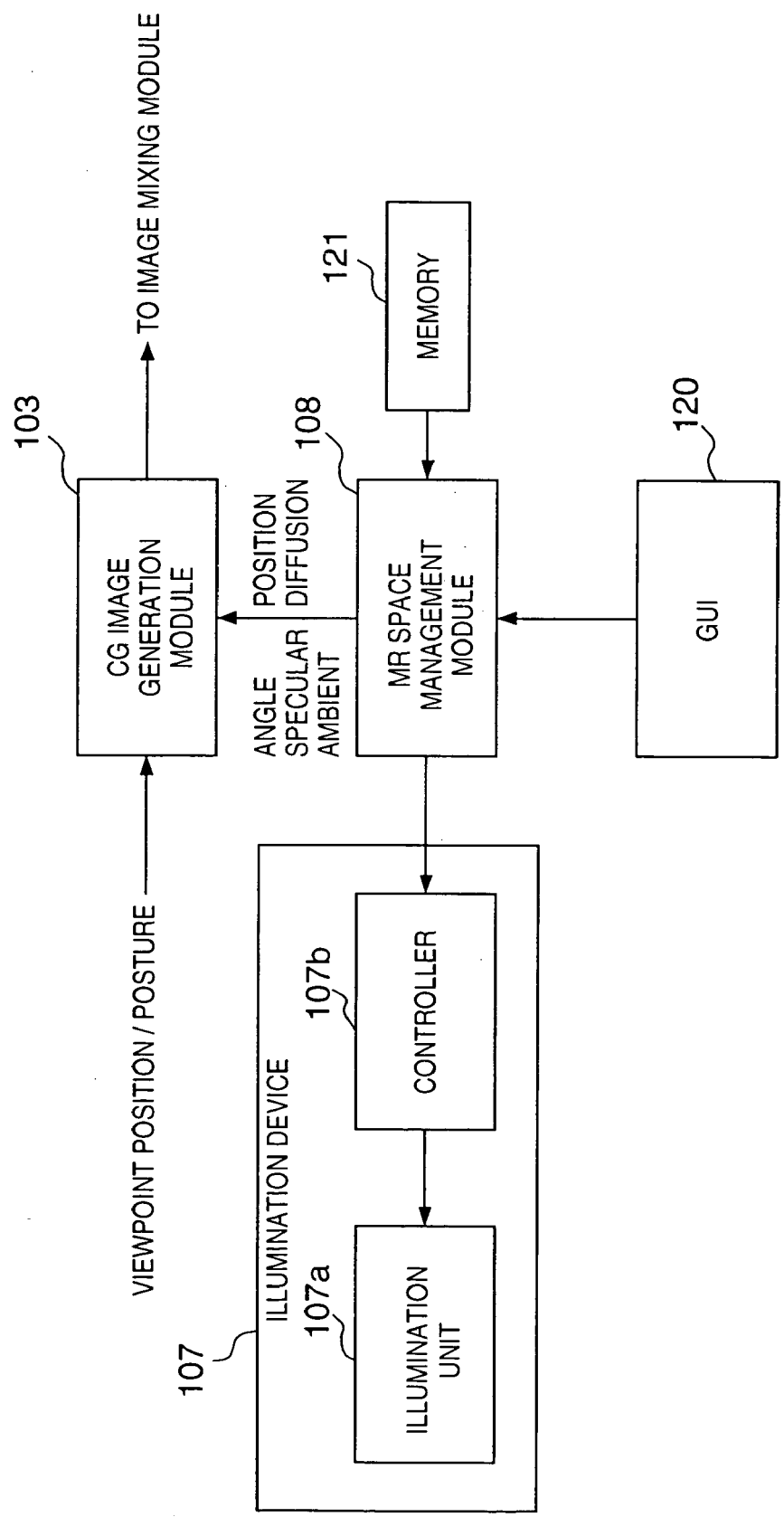
FIG. 31 is a block diagram functionally showing operations in principal parts of the mixed reality presentation apparatus.

FIG. 31 explains the relationship among the illumination device 107, management module 108, and image mixing module 103.

Figure 32:
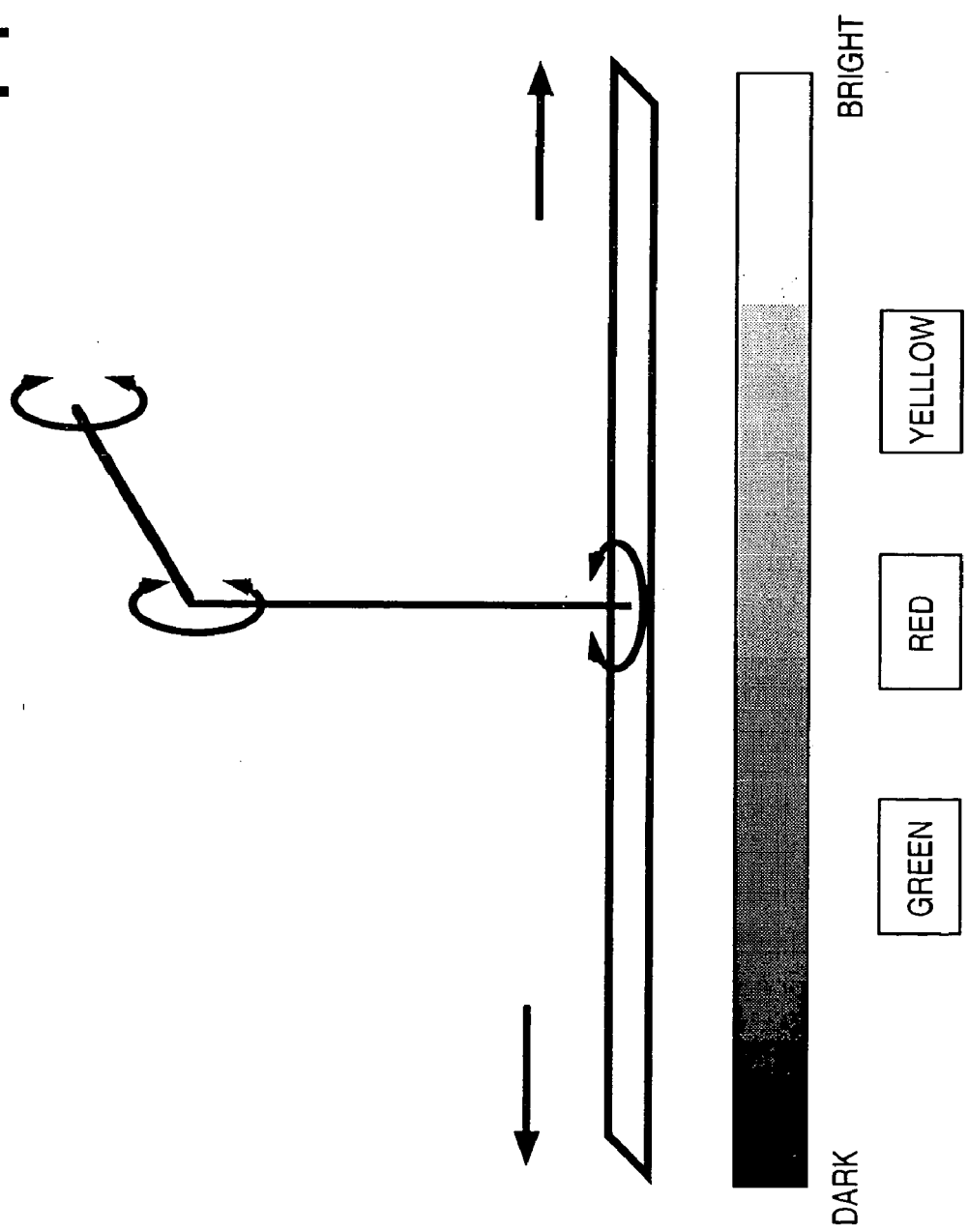
FIG. 32 is a view for explaining a GUI used to change illumination conditions.

A GUI 120 is a graphic user interface which is displayed on a display device by the management module to change illumination conditions. FIG. 32 shows an example of the GUI. Referring to FIG. 32, arrows are control buttons which can be changed by, e.g., a mouse. For example, when the user wants to slide the illumination unit horizontally, he or she clicks one of the right and left arrows with the mouse, and moves the desired arrow in a desired direction. When the user wants to adjust angle, he or she selects the arrow of a portion to be changed by clicking the mouse and rotates it using, e.g., a joystick. Using this GUI, the angles of the respective portions of the illumination unit shown in FIG. 30, brightness and color of illumination, and the like can be changed using a keyboard, joystick, or the like. Note that in the GUI, the arrow of a portion to be changed may be selected by clicking the mouse and the angle may be set by dragging the mouse in place of the joystick.

The illumination conditions set by the user via this GUI are sent to a controller 107b in the illumination device 107. The controller 107b converts the illumination conditions into drive amounts of the motors and the like of the illumination device 107, and outputs them. In this manner, the illumination device 107 is set at illuminance and the like set by the user via the GUI.

On the other hand, the illumination conditions set via the GUI are converted into illumination condition parameters, e.g., angle, specular, ambient, position, diffusion, and the like defined by a space language used in the generation module 103. Note that these parameter values are determined in advance by experiments under various illumination conditions. The image generation module 103 sets the received parameter values in a rendering routine.

Figure 33:
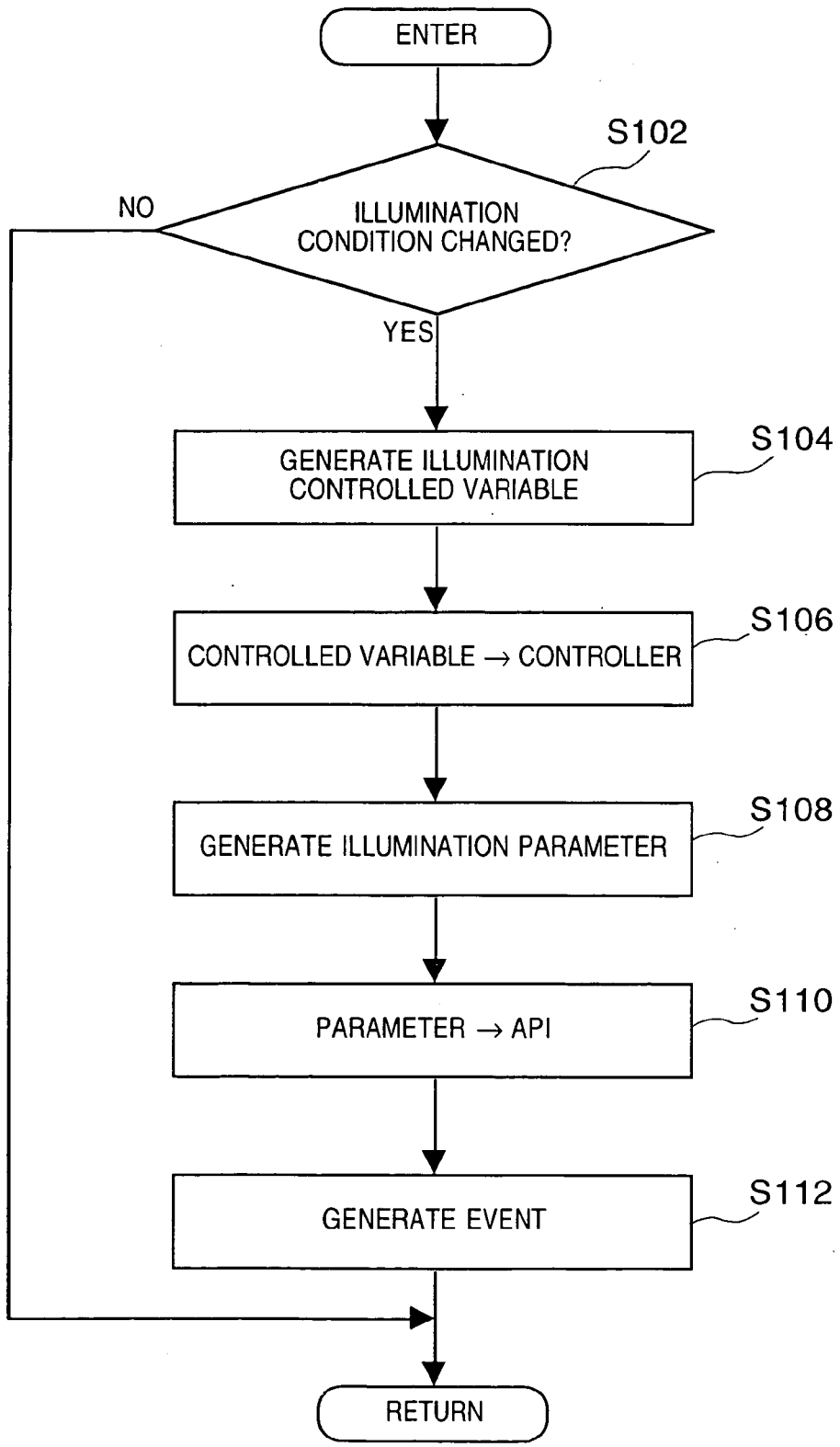
FIG. 33 is a flow chart showing the control sequence of a mixed reality space management module.
Figure 34:
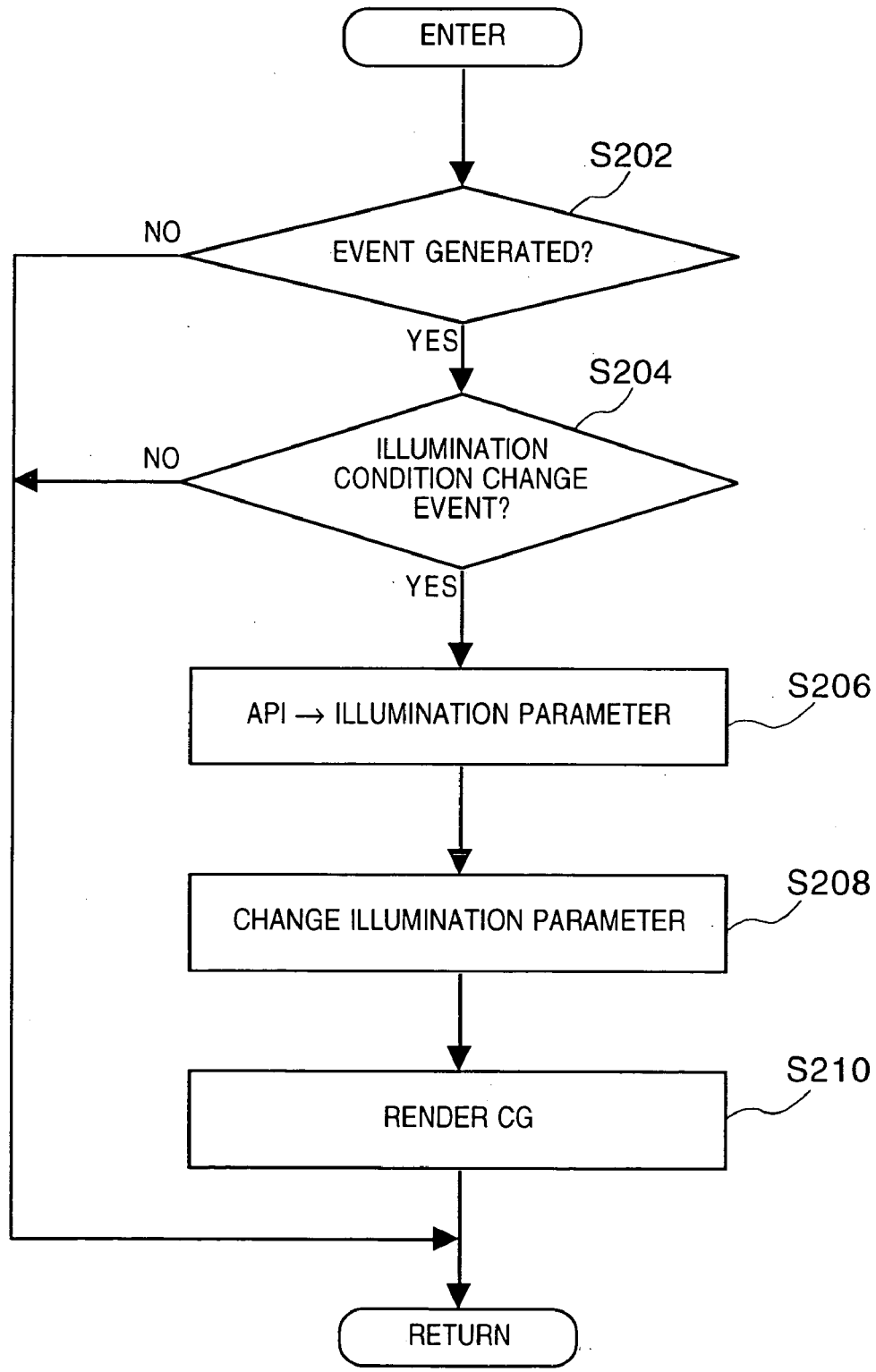
FIG. 34 is a flow chart showing the control sequence of a CG image generation module.

FIG. 33 shows the control sequence of the mixed reality space management module 108, and FIG. 34 shows the control sequence of the image generation module 103. The mixed reality space management module 108 and image generation module 103 are program modules and communicate with each other via an API (Application Program Interface) of a predetermined protocol. More specifically, the management module 108 monitors in step S102 if the user has changed illumination conditions using the GUI. If YES in step S102, the module 108 computes various controlled variables for the illumination unit in step S104, and send them to the controller 107b of the illumination device 107 in step S106. The module 108 generates illumination parameters such as angle in step S108, and the like and send them to the image generation module 103 via an API in step S110. In step S112, the module 108 generates an event and informs the module 103 of the event.

In the flow chart shown in FIG. 34, the image generation module 103 waits for generation of an event (step S202). If an event is generated, the module 103 confirms in step S204 if the event is an illumination condition change event, and receives illumination parameters via an API in step S206. In step S208, the module 103 replaces parameters in the rendering routine by the received parameters. In step S210, the module 103 renders a CG image in accordance with the received parameters. The rendered CG image has shades or the like, which have been changed in accordance with the changed illumination conditions.

Figure 38A:
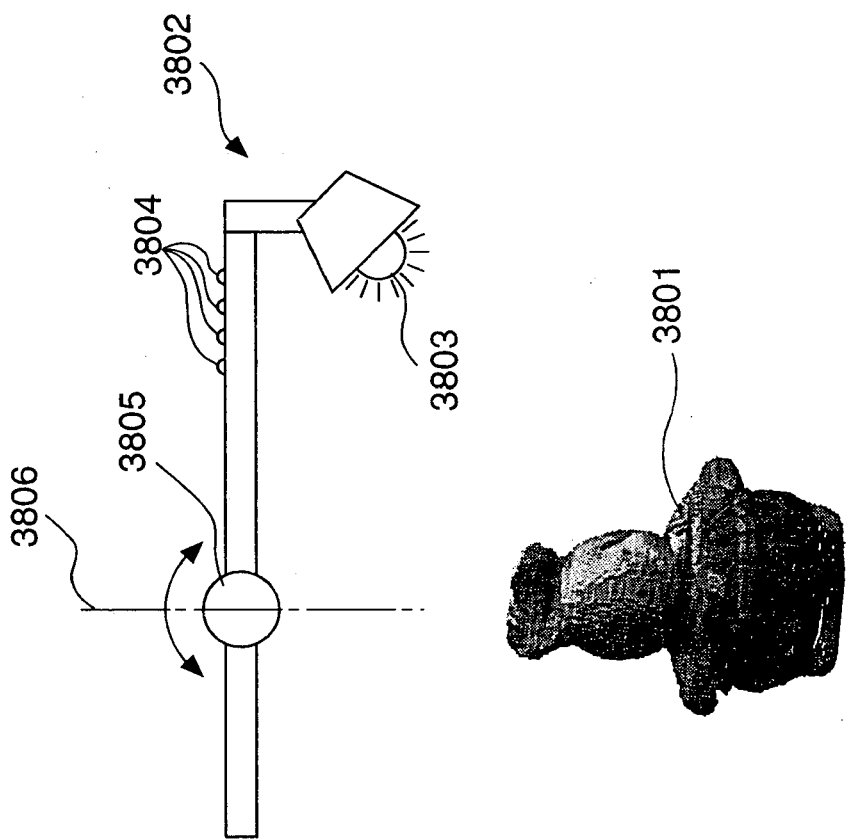
Figure 38C:
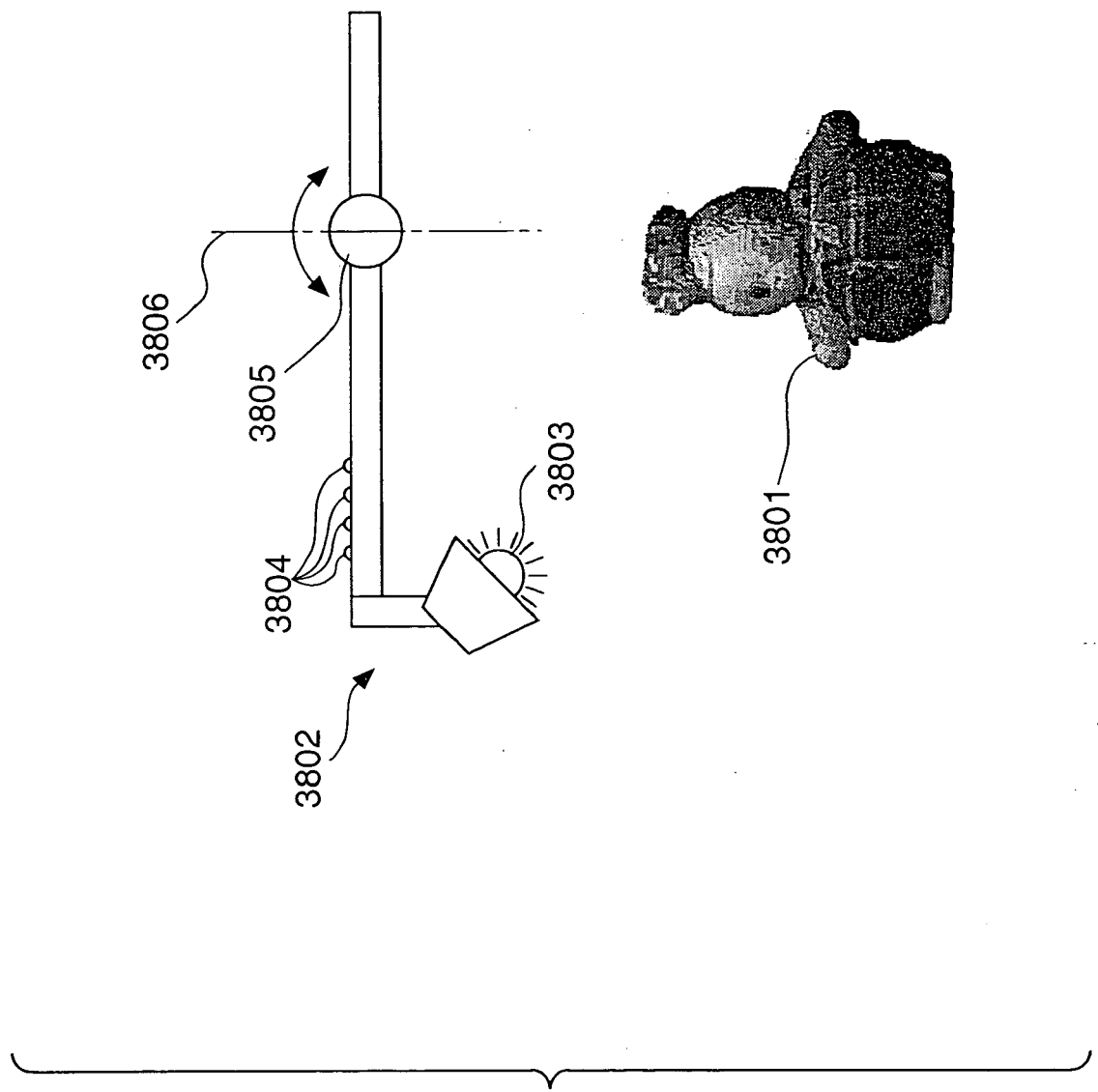

The states of such changes of a CG image are shown in FIGS. 38A to 38C. An illumination device 3802 has light source 3803, control buttons 3804 for adjusting illumination brightness and manipulator 3805 for turning the illumination device in horizontal direction around the axis 3806. The illumination (light source) is at a position "n". Accordingly, an object image 3801 is rendered based on ray space data RS(Ln).

Various modifications of this embodiment may be made within the scope of the present invention.

Figure 35:
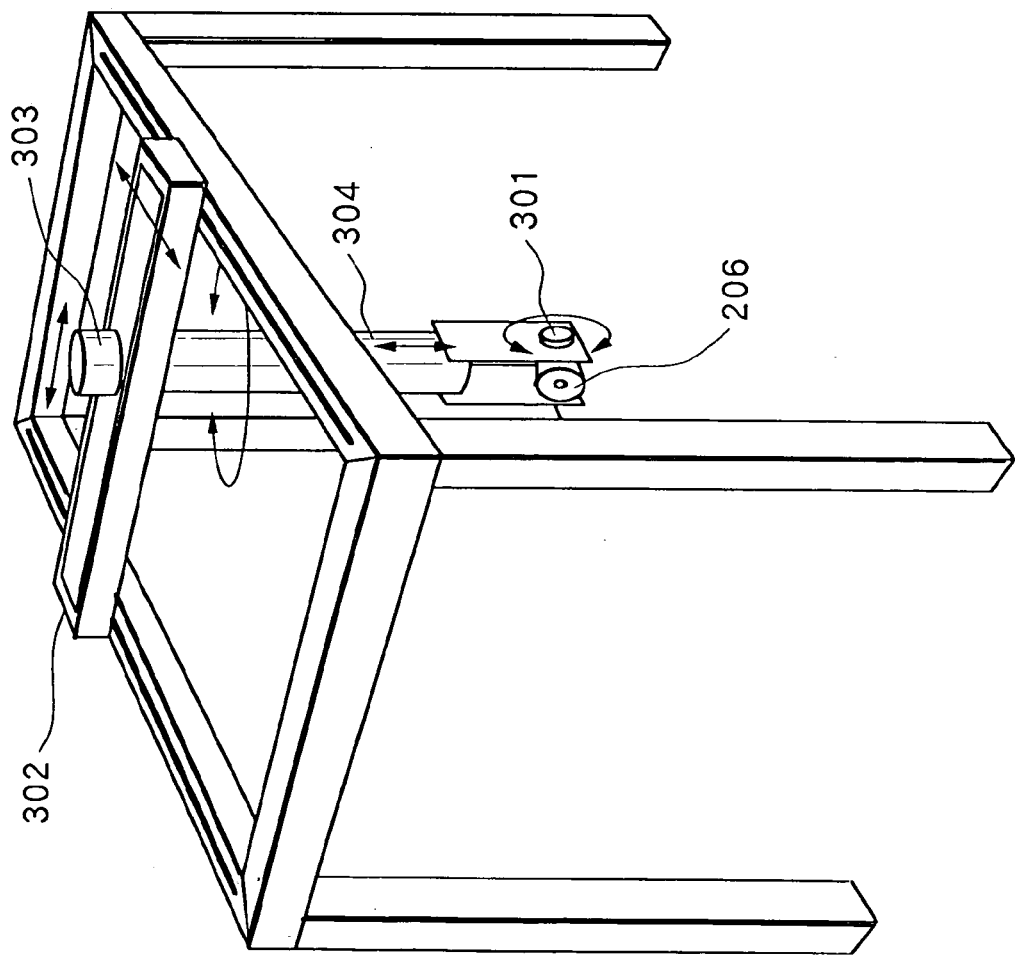
FIG. 35 is a view showing the arrangement of a modification of an illumination device.

FIG. 35 explains a modification of an illumination unit 107a. In this modification, the light control unit 206 is supported by a tilt unit 301, which is axially supported to be free to tilt. The tilt unit 301 is vertically movable. A support shaft 304 is connected to a motor 303 and can be rotated to pan the light control unit. The support shaft 304 is parallelly movable along a slide table 302. The slide table 302 is movable in a direction perpendicular to the moving direction of the shaft 304.

In the above embodiment, the GUI is used to change illumination conditions. Instead, hardware devices such as a volume, slide switch, joystick, and the like may be used. When such hardware devices are used, output signals from these devices must be sent to the apparatus having the management module.

In the apparatus of the above embodiment, the illumination conditions are changed under the control of a computer. The present invention is not limited to such specific control. For example, the present invention can be applied when the illumination conditions are manually changed. On the other hand, condition change values on the GUI 120 may be read by the controller 107b in a software manner. In this modification, the need for the rotary encoder in the above embodiment can be obviated. In order to detect changes in illumination conditions, an illuminance sensor, a sensor for detecting illumination direction, and the like are provided, and these sensor outputs are supplied to the management module.

In the above embodiment, illumination program parameters are pre-stored in a predetermined memory 121, but may be computed in real time on the basis of the detected illuminance, illumination direction, and the like. For this purpose, conversion formulas for deriving parameter values from the detection values of the illumination conditions may be pre-stored in the memory, and parameters may be computed using these conversion formulas in real time.

To recapitulate, according to the present invention, the illumination conditions of a virtual image can be acquired in real time in correspondence with changes in real illumination. For this reason, deviation of image quality between real and virtual images due to structural differences of the illumination conditions can be minimized.

As many apparently widely different embodiments of the present invention can be made without departing from the spirit and scope thereof, it is to be understood that the invention is not limited to the specific embodiments thereof except as defined in the claims.

What is claimed is:

1. An image processing method for generating a shadow image of a virtual object itself in a virtual space, comprising the steps of:
   sensing an image of a real object by a camera while illuminating the real object corresponding to the virtual object by a light source at a predetermined illumination position;
   extracting a silhouette of the real object from the image of the real object;
   adding preferred image information as a shadow to pixels in the silhouette; and
   storing the silhouette image together with position information of the light source, the silhouette image being able to be found by search and retrieved at a later time.

2. The method according to claim 1, wherein the preferred image information includes a predetermined black pixel value and a predetermined transparency value.

3. The method according to claim 1, wherein the silhouette image undergoes a blur process.

4. The method according to claim 3, wherein the degree of blur is changed in correspondence with distance from the virtual object to a virtual light source.

5. The method according to claim 1, wherein a viewpoint position of the camera matches the position of the illumination light source.

6. An image processing method for generating a shadow image of a virtual object itself in a virtual space, comprising the steps of:
   storing space data of the virtual object, a shadow image of a real object corresponding to the virtual object, and a position of an illumination light source upon forming the shadow image in a predetermined memory;
   reading out the shadow image from the memory in accordance with a position of a virtual illumination, and a relative position of the virtual object; and
   mapping the readout shadow image on a predetermined mapping plane.

7. The method according to claim 6, wherein the mapping plane is determined on the basis of a bounding box of the virtual object.

8. The method according to claim 6, further comprising the step of changing and setting an illumination condition of the virtual illumination light source to be an arbitrary value, and wherein the correction step includes the step of correcting the pixel values in accordance with the changed illumination condition.

9. The method according to claim 6, wherein when a plurality of virtual light sources are ON at the same time, a plurality of correction results which are corrected in accordance with the respective virtual illumination light sources are added for one pixel position to obtain a final pixel value.

10. The method according to claim 6, wherein when some of a plurality of virtual light sources are ON at the same time, a plurality of correction results which are corrected in accordance with the respective ON virtual illumination light sources are added for one pixel position to obtain a final pixel value.

11. The method according to claim 6, wherein when the illumination is located at a high-level position, a mapping plane with a simple shape is generated.

12. An image processing apparatus for generating a shadow image of a virtual object itself in a virtual space, comprising:
   means for sensing an image of a real object by a camera while illuminating the real object corresponding to the virtual object from a light source at a predetermined illumination position;
   means for extracting a silhouette of the real object from the image of the real object;
   means for adding preferred image information as a shadow to pixels in the silhouette; and
   means for storing the edge image together with position information of the light source, the silhouette image being able to be found by search and retrieved at a later time.

13. The apparatus according to claim 12, wherein the preferred image information includes a predetermined black pixel value and a predetermined transparency value.

14. The apparatus according to claim 12, wherein when the viewpoint position of the camera is different from the position of the light source, the silhouette image is corrected by re-projecting the silhouette image to have the position of the light source as a viewpoint position.

15. The apparatus according to claim 12, further comprising means for performing a blur process of the silhouette image.

16. The apparatus according to claim 15, wherein the degree of blur is changed in correspondence with distance from the virtual object to a virtual light source.

17. The apparatus according to claim 12, wherein a viewpoint position of the camera matches the position of the illumination light source.

18. An image processing apparatus for generating a shadow image of a virtual object itself in a virtual space, comprising the steps of:
   means for storing space data of the virtual object, a shadow image of a real object corresponding to the virtual object, and a position of an illumination light source upon forming the shadow image in a predetermined memory;
   means for reading out the shadow image from the memory in accordance with a position of a virtual illumination, and a relative position of the virtual object; and
   means for mapping the readout shadow image on a predetermined mapping plane.

19. The apparatus according to claim 18, wherein the mapping plane is determined on the basis of a bounding box of the virtual object.

20. The apparatus according to claim 18, further comprising means for changing and setting an illumination condition of the virtual illumination light source to be an arbitrary value, and wherein said correction means corrects the pixel values in accordance with the changed illumination condition.

21. The apparatus according to claim 18, wherein when a plurality of virtual light sources are ON at the same time, a plurality of correction results which are corrected in accordance with the respective virtual illumination light sources are added for one pixel position to obtain a final pixel value.

22. The apparatus according to claim 18, wherein when some of a plurality of virtual light sources are ON at the same time, a plurality of correction results which are corrected in accordance with the respective ON virtual illumination light sources are added for one pixel position to obtain a final pixel value.

23. The apparatus according to claim 18, wherein when the illumination is located at a high-level position, a mapping plane with a simple shape is generated.

24. A storage medium that stores a control program for making a computer execute an image process for generating a shadow image of a virtual object itself in a virtual space, said image process comprising the steps of:
   acquiring an image of a real object sensed by a camera while illuminating the real object corresponding to the virtual object from a light source at a predetermined illumination position;
   extracting a silhouette of the real object form the image of the real object;
   adding preferred image information as a shadow to pixels in the silhouette; and
   storing the silhouette image together with position information of the light source, the silhouette image being able to be found by search and retrieved at a later time.

25. A storage medium that stores a control program for making a computer execute an image process for generating a shadow image of a virtual object itself in a virtual space, said image process comprising the steps of:
   storing space data of the virtual object, a shadow image of a real object corresponding to the virtual object, and a position of an illumination light source upon forming the shadow image in a predetermined memory;
   reading out the shadow image form the memory in accordance with a position of a virtual illumination, and a relative position of the virtual object; and
   mapping the readout shadow image on a predetermined mapping plane.

26. An image processing method for generating a shadow image of a virtual object itself in a virtual space, comprising the steps of:
   acquiring ray space data of the virtual object;
   setting a position of a virtual illumination;
   obtaining a shadow image of the virtual object, corresponding to the position of the virtual illumination;
   calculating a shadow mapping plane based on a shape of a bounding box for the virtual object and the position of the virtual illumination; and
   mapping the shadow image on the shadow mapping plane;
   wherein the shadow image is generated by extracting a silhouette of a real object corresponding to the virtual object from an image obtained by sensing the real object from the position of the virtual illumination.

27. An image processing apparatus for generating a shadow image of a virtual object itself in a virtual space, said apparatus comprising:
   an acquiring unit configured to acquire ray space data of the virtual object;
   a setting unit configured to set a position of a virtual illumination;
   an obtaining unit configured to obtain a shadow image of the virtual object, corresponding to the position of the virtual illumination;
   a calculating unit configured to calculate a shadow mapping plane based on a shape of a bounding box for the virtual object and the position of the virtual illumination; and
   a mapping unit configured to map the shadow image on the shadow mapping plane;
   wherein the shadow image is generated by extracting a silhouette of a real object corresponding to the virtual object from an image obtained by sensing the real object from the position of the virtual illumination.

28. A storage medium that stores a control program for making a computer execute an image process for generating a shadow image of a virtual object itself in a virtual space, said image process comprising the steps of:
   acquiring ray space data of the virtual object;
   setting a position of a virtual illumination;
   obtaining a shadow image of the virtual object, corresponding to the position of the virtual illumination;
   calculating a shadow mapping plane based on a shape of a bounding box for the virtual object and the position of the virtual illumination; and
   mapping the shadow image on the shadow mapping plane; wherein the shadow image is generated by extracting a silhouette of a real object corresponding to the virtual object from an image obtained by sensing the real object form the position of the virtual illumination.

* * * * *

UNITED STATES PATENT AND TRADEMARK OFFICE
CERTIFICATE OF CORRECTION

PATENT NO. : 6,930,685 B1  Page 1 of 1
DATED : August 16, 2005
INVENTOR(S) : Yukio Sakagawa et al.

It is certified that error appears in the above-identified patent and that said Letters Patent is hereby corrected as shown below:

Column 6,
Line 43, "all a" should read -- all of a --.

Column 12,
Lines 36 and 38, "send" should read -- sends --.

Column 15,
Line 49, "form" should read -- from --.

Column 16,
Lines 1 and 60, "form" should read -- from --.
Line 56, "wherein" should begin a new paragraph.

Signed and Sealed this

Ninth Day of May, 2006

JON W. DUDAS
*Director of the United States Patent and Trademark Office*